United States Patent
Maekawa

(10) Patent No.: US 7,392,299 B2
(45) Date of Patent: Jun. 24, 2008

(54) CONFIGURATION SETTING SYSTEM FOR NETWORK SYSTEM

(75) Inventor: Yohei Maekawa, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 963 days.

(21) Appl. No.: 10/626,548

(22) Filed: Jul. 25, 2003

(65) Prior Publication Data
US 2005/0005003 A1 Jan. 6, 2005

(30) Foreign Application Priority Data

Jul. 25, 2002 (JP) ............................. 2002-215964
Nov. 18, 2002 (JP) ............................. 2002-333269

(51) Int. Cl.
*G06F 15/177* (2006.01)

(52) U.S. Cl. .................... 709/220; 709/209; 709/219; 709/224; 709/230; 710/8; 710/10; 710/104; 711/1; 711/170

(58) Field of Classification Search ............... 709/219, 709/220, 221, 222, 230, 209, 224; 710/8, 710/10, 104; 711/1, 170
See application file for complete search history.

(56) References Cited

U.S. PATENT DOCUMENTS

| | | | |
|---|---|---|---|
| 5,787,246 A * | 7/1998 | Lichtman et al. ............. | 709/220 |
| 5,872,928 A * | 2/1999 | Lewis et al. .................. | 709/222 |
| 6,026,078 A * | 2/2000 | Smith .......................... | 370/258 |
| 6,195,687 B1 * | 2/2001 | Greaves et al. ............... | 709/208 |
| 6,212,585 B1 * | 4/2001 | Chrabaszcz .................. | 710/302 |
| 6,324,571 B1 * | 11/2001 | Hacherl ....................... | 709/208 |
| 6,349,304 B1 * | 2/2002 | Boldt et al. ................... | 707/102 |
| 6,363,416 B1 * | 3/2002 | Naeimi et al. ................ | 709/209 |
| 6,671,748 B1 * | 12/2003 | Cole et al. ..................... | 710/8 |
| 6,697,805 B1 * | 2/2004 | Choquier et al. .............. | 707/10 |
| 6,941,356 B2 * | 9/2005 | Meyerson ..................... | 709/220 |
| 6,978,301 B2 * | 12/2005 | Tindal .......................... | 709/223 |
| 7,016,740 B2 * | 3/2006 | Nakamura et al. ............. | 700/19 |
| 7,047,088 B2 * | 5/2006 | Nakamura et al. ............. | 700/19 |
| 7,065,562 B2 * | 6/2006 | Courtney ...................... | 709/220 |
| 7,181,508 B1 * | 2/2007 | Sretenovic .................... | 709/220 |
| 2002/0093675 A1 | 7/2002 | Matsuda | |
| 2002/0161740 A1 | 10/2002 | Nakamura et al. | |
| 2004/0153532 A1 * | 8/2004 | Hosotani et al. ............. | 709/222 |

FOREIGN PATENT DOCUMENTS

| | | |
|---|---|---|
| EP | 0 930 748 A2 | 7/1999 |
| EP | 1 191 450 A1 | 3/2002 |
| JP | A 8-249281 | 9/1996 |

(Continued)

*Primary Examiner*—Michael Won
(74) *Attorney, Agent, or Firm*—Oliff & Berridge, PLC

(57) ABSTRACT

A configuration setting system is provided for a network system including a plurality of electronic devices communicably connected to a network. The configuration setting system sets a configuration of an electronic device based on a configuration of a predetermined electronic device functioning as a model device. The predetermined electronic device is provided with a checking system that checks whether there is a currently operating model device on the network when the predetermined electronic device is to function as the model device, and a determining system that determines, when the checking system detects no model device on the network, that the predetermined electronic device should operate as the model device for the network system.

13 Claims, 21 Drawing Sheets

FOREIGN PATENT DOCUMENTS

| | | |
|---|---|---|
| JP | A 09-149061 | 6/1997 |
| JP | A 11-161441 | 6/1999 |
| JP | A 11-203087 | 7/1999 |
| JP | A 11-249839 | 9/1999 |
| JP | A 2000-347826 | 12/2000 |
| JP | A 2001-175626 | 6/2001 |
| JP | A 2002-23983 | 1/2002 |
| JP | A 2002-86859 | 3/2002 |
| JP | A 2002-218153 | 8/2002 |
| WO | WO 01/73558 A1 | 10/2001 |

* cited by examiner

FIG.11

| PREVIOUS NETWORK ADDRESS |
|---|
| 11. 122. *.* |

FIG.12

| NETWORK ADDRESS | OCCURRENCE |
|---|---|
| 11. 122. *.* | 178 |
| 133. 233. 22. * | 5 |
| ... | ... |
| 11. 125. *.* | 4 |

FIG.13

NOTIFY* HTTP/1.1

HOST : 289. 255. 255. 250:1900

LOCATION : http://11.22.33.44/upnp/description/model.xml

NT : upnp : rootdevice

NTS : ssdp : modelchange

SERVER : LaserPrinter1/1.0UPnP/1.0

FIG.23A

| POP Server Address | 11.122.1.2 |
|---|---|
| POP Polling Interval (min.) | 10 |
| ....... | ....... |
| ....... | ....... |
| Toner Save | YES |

FIG.23B

| Own IP Address | 11.122.33.44 |
|---|---|
| ....... | ....... |
| ....... | ....... |
| Own Mail Address | mfo@bro.com |

CONFIGURATION SETTING SYSTEM FOR NETWORK SYSTEM

BACKGROUND OF THE INVENTION

The present invention relates to a configuration setting system for a network system, in which a plurality of electronic devices are connected to a network, and operational parameters of the plurality of electronic devices are set based on the settings of one of the plurality of electronic devices.

When a plurality of electronic devices are connected to a network, it is sometimes necessary to set the operational parameters of a part of or all of the plurality of electronic devices to be predetermined settings. In such a case, if the operational parameters of each electronic device are set individually, for example, by a system administrator, it is very troublesome to set all the parameters of a number of electronic devices. In order to facilitate such a work, conventionally, an automatic configuration setting system has been suggested, in which a model electronic device is defined, and the operational parameters of the plurality of the electronic devices are automatically set based on the settings of the model electronic device.

However, when a predetermined electronic device is determined to be the model device for the network system, if it is disconnected from the network, even temporarily, there is no model printer on the network, and the other electronic devices cannot obtain the necessary settings therefrom.

In order to avoid such a problem, when an existing model device is disconnected from the network, another model device may be determined, from among the currently connected electronic devices, to operate as the model device.

However, if the previous model device is re-connected to the network again after the new model device is determined, two model devices exist on the network simultaneously. Generally, the electronic devices are frequently connected to and disconnected from the network. Therefore, there could be a chance that a plurality of model devices may simultaneously exist on the network. In such a case, it is difficult or impossible to determine an appropriate model device to be used for setting the operational parameters of the other electronic devices on the network.

SUMMARY OF THE INVENTION

The present invention is advantageous in that it restricts the number of the model device on the network to one, even when the electronic devices are connected/disconnected frequently.

Further, the present invention is advantageous in that it is ensured that only one model device is on the network.

According to an aspect of the invention, there is provided a configuration setting system for a network system including a plurality of electronic devices communicably connected to a network, the configuration setting system setting a configuration of an electronic device based on a configuration of another electronic device that functions as a model device. The plurality of electronic devices include a candidate electronic device to operate as the model device. The candidate electronic device being provided with a checking system that checks whether there is a currently operating model device on the network when the candidate electronic device is to function as the model device, and a determining system that determines, when the checking system detects the model device, only one of the candidate electronic device and the currently operating model device as a new model device.

According to another aspect of the invention, there is provided a configuration setting system for a network including a plurality of electronic devices communicably connected to a network, the configuration setting system setting a configuration of an electronic device based on a configuration of a predetermined electronic device functioning as a model device. In this system, the predetermined electronic device is provided with a detecting system that detects whether a network to which the predetermined electronic device is connected has been changed, and a function releasing system that releases the function as the model device of the predetermined electronic device when the detecting system detects that the predetermined device is connected to another network.

According to a further aspect of the invention, there is provided an electronic device capable of operating as a model device for a configuration setting system for a network system having a plurality of electronic devices communicably connected to a network, a configuration of the plurality of electronic devices being set based on a configuration of the model device. The electronic device capable of operating as the model device is provided with a checking system that checks whether there is a currently operating model device on the network when the electronic device is to function as the model device, and a determining system that determines, when the checking system detects the currently operating model device on the network, one of the electronic device and the currently operating model device as a new model device.

According to a furthermore aspect of the invention, there is provided an electronic device capable of operating as a model device for a configuration setting system for a network system having a plurality of electronic devices communicably connected to a network, a configuration of the plurality of electronic devices being set based on a configuration of the model device. The electronic device capable of operating as the model device is provided with a detecting system that detects whether a network to which the electronic device capable of operating as a model device is connected has been changed, and a function disabling system that disables the function as the model device of the electronic device capable of operating as a model device when the detecting system detects that the electronic device is connected to another network.

According to a still further aspect of the invention, there is provided a configuration setting system for a network system including a plurality of electronic devices communicably connected to a network, the configuration setting system setting a configuration of an electronic device based on a configuration of a predetermined electronic device functioning as a model device. In such a system, the predetermined electronic device is provided with a checking system that checks whether there is a currently operating model device on the network when the predetermined electronic device is to function as the model device, and a determining system that determines, when the checking system detects no model device, the predetermined electronic device as the model device for the network system.

Optionally, the determining system may include an input system that allows a user to select one of the currently operating model device and the predetermined electronic device as the model device. Further, when the currently operating model device is on the network and the function as the model device is releasable, the determining system determines selected one of the currently operating model device and the predetermined electronic device as the model device and the other as a non-model device.

Alternatively, the determining system may include an input system that allows a user to select one of the currently operating model device and the predetermined electronic device as the model device. In this case, when the currently operating model device is on the network and the function as the model device is not releasable, the setting system may set the configuration of the predetermined electronic device so as to operate as the non-model device.

Still alternatively, when the currently operating model device is on the network, the determining system may determine one of the currently operating model device and the predetermined electronic device as the model device and the other as a non-model device in accordance with predetermined information. The predetermined information may be priority information.

According to a further aspect of the invention, there is provided a configuration setting system having a plurality of electronic device communicably connected through a network. The plurality of electronic devices include a first electronic device which is to function as a model device and a second device which currently functions as the model device. In such a system, the first device has a requesting system that requests the second device to transmit a configuration thereof, a replying system that transmits a configuration of the first device when the request is received from another electronic device, a determining system that determines whether configuration of the second device can be obtained in accordance with the request when the first device operates as the non-model device, and a controlling system that controls the first device to operate as the model device and controls the replying system to transmits the configuration of the first device, when the determining system determines that the configuration of the second device cannot be obtained.

According to a furthermore aspect of the invention, there is provided an electronic device for a configuration setting system having a plurality of electronic device communicably connected through a network. The electronic device may be provided with a requesting system that requests another electronic device which currently functions as the model device to transmit a configuration thereof, a replying system that transmits a configuration of the electronic device when the request is received from another electronic device, a configuration of each of the plurality of electronic devices which functions as a non-model device being set in accordance with the configuration of the model device, a determining system that determines whether configuration of the electronic device functioning as the model device can be obtained in accordance with the request when the each of the electronic device operates as the non-model device, and a controlling system that controls the electronic device, which is to function as the model device, to operate as the model device and controls the replying system to transmits the configuration of the electronic device when the determining system determines that the configuration of the electronic device functioning as the model device cannot be obtained.

According to a further aspect of the invention, there is provided a configuration setting system having a plurality of electronic devices communicably connected through a network, a configuration of each electronic device being set in accordance with a configuration of a model device, the configuration setting system being configured such that if there are a plurality of model devices simultaneously exits on the network, only one of the model devices is kept functioning as the model device and the other model devices are turned to non-model devices in accordance with predetermined information.

Optionally, the predetermined information may include priorities defined to the plurality electronic devices, respectively.

According to a furthermore aspect of the invention, there is provided an electronic device for a configuration setting system in which a plurality of electronic devices are communicably connected to a network, a configuration of each of the plurality of electronic devices being set in accordance with a model device. In such a system, the electronic device is configured to have a priority, and is provided with a detecting system that detects, when the electronic device operates as the model device, participation of another model device on the network, a comparing system that compares priorities of the electronic device and the another model device detected by the detecting system, and a setting system that sets the electronic device one of the model device and a non-model device depending on a comparison result of the comparing system.

According to a further aspect of the invention, there is provided an electronic device for a network system to which a model electronic device is connected, the model electronic device operating in accordance with predetermined operational parameters stored therein, at least a part of the predetermined operational parameters stored in the model electronic device being used as at least a part of operational parameters of the electronic device.

According to another aspect of the invention, there is provided a model device of a configuration setting system for a network system including a plurality of electronic devices communicably connected to a network, the configuration setting system setting a configuration of an electronic device based on a configuration of the model device. The model device may be provided with a determining system that determines whether an other electronic device is to function as the model device for the network system, and a setting system that sets the configuration of the model device so as to function as a non-model device, the setting system setting the configuration of the other electronic device to function as the model device when the determining system determines that the other electronic device it to function as the model device for the network system.

According to a furthermore aspect of the invention, there is provided a model device of a configuration setting system for a network system including a plurality of electronic devices communicably connected to a network, the configuration setting system setting a configuration of an electronic device based on a configuration of the model device. The model device may be provided with a determining system that determines whether an other electronic device is to function as the model device for the network system, and a setting system that that sets the configuration of the other electronic device to function as a non-model device when the determining system determines that the model device is kept operating as the model device.

The systems and devices according to the present invention can be realized when appropriate programs provided and executed by a computer. Such programs may be stored in recording medium such as a flexible disk, CD-ROM, memory cards and other similar medium and distributed. Alternatively or optionally, such programs can be distributed through networks such as the Internet.

BRIEF DESCRIPTION OF THE
ACCOMPANYING DRAWINGS

FIG. 11 shows an example of a network change table;

FIG. 12 shows an example of a network address counter table;

FIG. 13 shows an example of enhanced SSDP data;

FIG. 23A shows a table indicating common setting parameters for each electronic device of the network system shown in FIG. 19; and FIG. 23B shows a table indicating setting parameters intrinsic to each electronic device of the network system shown in FIG. 19.

DETAILED DESCRIPTION OF THE EMBODIMENTS

Hereinafter, embodiments of the present invention will be described with reference to the accompanying drawings.

First Embodiment

Figure 1:
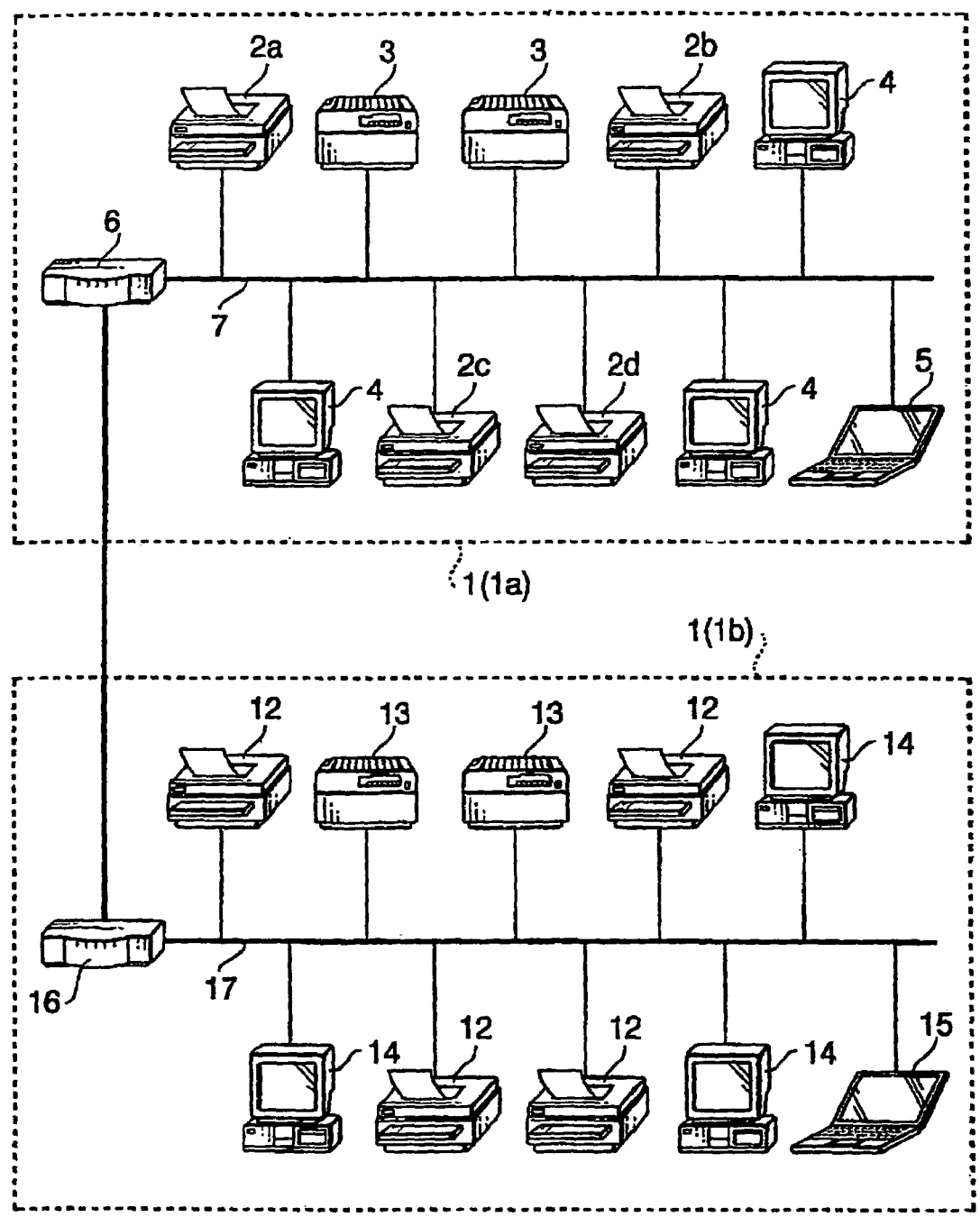
FIG. 1 shows an exemplary configuration of a network system according to a first embodiment of the invention.
Figure 2A:
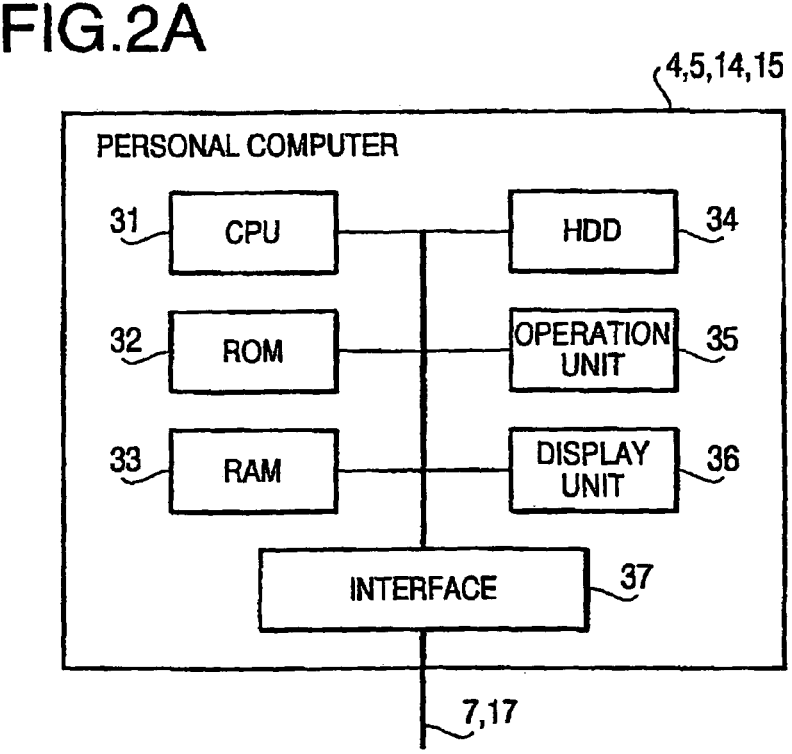
FIG. 2A is a block diagram showing an exemplary configurations of a personal computer, which is one of electronic devices.
Figure 2B:
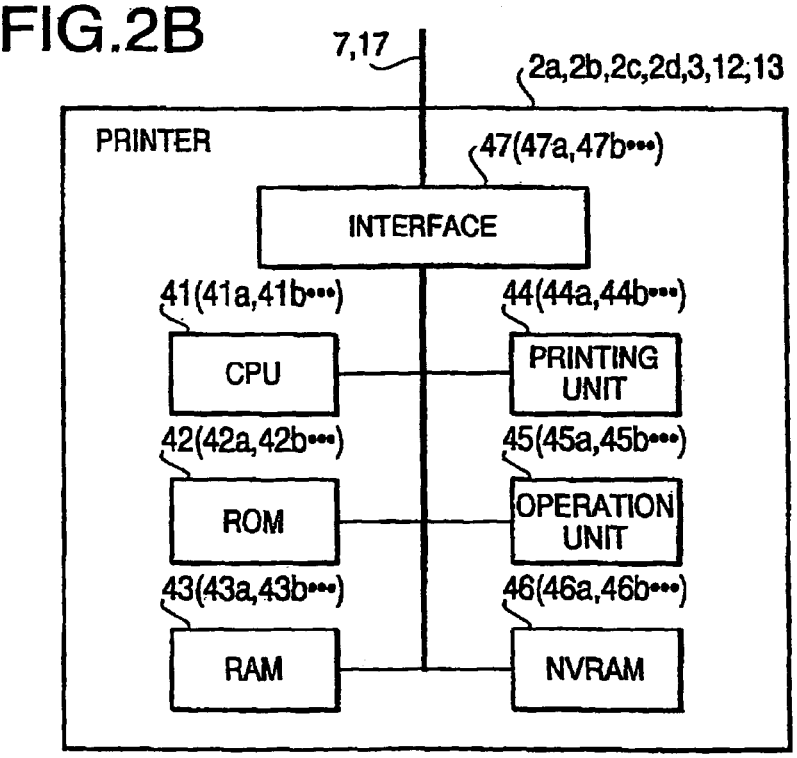
FIG. 2B is a block diagram showing an exemplary configurations of a printer, which is one of electronic devices.

With reference to FIGS. 1, 2A and 2B, a configuration of a network system according to a first embodiment will be described.

FIG. 1 shows an exemplary configuration of the network system according to the first embodiment of the invention. FIG. 2A is a block diagram showing an exemplary configurations of a personal computer 4 (5, 14 or 15), which is one of electronic devices included in the network system shown in FIG. 1. FIG. 2B is a block diagram showing an exemplary configurations of a printer 7 (or 17), which is also one of electronic devices included in the network system shown in FIG. 1. It should be noted that, in some embodiments, a printer is referred to as an example of an electronic device. However, the present invention is not limited to such a configuration, and the invention is applicable to any electronic device as well as the printer.

In FIG. 1, two network systems 1a and 1b are shown. The network system 1a includes, as electronic devices, four printers 2a, 2b, 2c and 2d of the same type, and two printers 3 of the same type, three desk-top personal computers 4 of the same type, one notebook type personal computer 5 and one router 6, which are connected to a LAN (Local Area Network) 7. The printers 2 and the printers 3 are different type printers.

The electronic devices of the network system 1a are configured to be communicable through the LAN 7, and are capable of exchanging data with an external electronic device through the router 6.

The network system 1b includes, as electronic devices, four printers 12 of the same type, two printers 13 of the same type, three desktop personal computers 14 of the same type, one notebook type personal computer 15 and one router 16, which are connected to a LAN 17. The printers 12 and the printers 13 are different type printers.

The electronic devices of the network system 1b are configured to be communicable through the LAN 17, and are capable of exchanging data with an external electronic device through the router 16. The router 6 and the router 16 are connected, accordingly, the electronic devices of the network system 1a and those of the network system 1b are capable of communicating with each other.

According to the embodiment, each electronic device of the network systems 1a and 1b is compatible to an SNMP (Single Network Management Protocol). The SNMP is a management protocol under a TCP/IP (Transmission Control Protocol/Internet Protocol) network standardized by IETF (Internet Engineering Task Force). According to the SNMP, the management of the electronic devices are performed by exchanging management data called MIP (Management Information Base) between an SNMP manager of the managing and an SNMP agent of the managed sides.

As shown in FIG. 2A, each of the personal computers 4, 5, 14 and 15 has a CPU (Central Processing Unit) 31, a ROM (Read Only Memory) 32, a RAM (Random Access Memory) 33, an HDD (Hard Disk Drive) 34, an operation unit 35, a display unit 36 and an interface 37.

The CPU 31 executes various operations and processing, and functions to control an operation of the personal computer. The ROM 32 is a read-only storage, and functions as a part of a main memory of the personal computer 4 (5, 14 or 15). The ROM 32 stores various programs to be executed by the CPU 31 such as a system program. The RAM 33 is a volatile readable/writable memory and functions as a part of the main memory of the personal computer 4 (5, 14 or 15). The RAM 33 includes a work area for storing intermediate data during a data processing. The HDD 34 is a readable/writable storage (a hard disk) and its drive.

The operation unit 35 includes an input device of the personal computer 4 (5, 14 and 15). That is, the operation unit 35 includes a keyboard having pointing devices such as a predetermined number of input keys and a mouse. The display unit 36 displays various pieces of information, and is composed of, for example, an LCD (Liquid Crystal Display) or a plasma display. As the LCD, a simple matrix type display, e.g., an STN type display or a DSTN type display, and an active matrix type display such as a TFT type display have been known. The interface 37 connects each of the personal computers 4, 5, 14 and 15 to the LANs 7 and 17, and enables the personal computers 4, 5, 14 and 15 to communicate with the other electronic devices connected to the LANs 7 and 17, such as the printers.

FIG. 2B is a block diagram showing a configuration of the printer. Although the printers 2a-2d, 3, 12 and 13 are different type printers, a fundamental configuration is substantially the same. Therefore, the printers are represented by a printer 2, and the configuration will be described with reference to the printer 2. Thus, the description on FIG. 2B is applicable to any one of the printers 2a-2d, 3, 12 and 13.

The printer 2 includes a CPU 41, a ROM 42, a RAM 43, a printing unit 44, an operation panel 45, an NVRAM (Non-Volatile RAM) 46 and an interface 47.

The ROM 42 is a read-only memory and serves as a part of a main memory of the printer 2. The ROM 42 stores various programs including a system program, and a program of a model printer determining procedure (see FIG. 3) which determines a model printer such that a plurality of model printers do not exist simultaneously on the network. The RAM 43 is a readable/writable memory and serves as a part of the main memory. The RAM 43 has a work area for storing intermediate operation results. The printing unit 44 provides a color or monochromatic printing function for printing characters/images.

The operation panel 45 includes a displaying device which displays various pieces of information, and an input device operated by an operator. The displaying device includes, for example, an LCD or plasma display, and the input device may have a touch panel placed on the screen of the displaying device.

On the screen (which functions as an operation screen) of the operation unit 45, an window for selecting a printer that currently on the network and operates as the model printer and another printer a system administrator or an operator intends to designate as a new model printer as a model printer to be used is displayed. The administrator or the user may designate one of the listed printers using the touch panel, thereby a printer to be used as the model printer is determined.

The NVRAM 46 is a readable/writable memory, data stored in which is not deleted even if powered off. The NVRAM 46 stores a setting of a model flag (i.e., Enabled or Disabled), a setting of an automatically set flag (i.e., "Enabled" or "Disabled"), and a setting of a function lock flag (i.e., ON or OFF). Further, when the printer operates as the model printer, the NVRAM 46 thereof stores setting information (e.g., a protocol to be used, a usage authorization (i.e., security), registration for servers, settings of language, time and printer) to be provided to the other printers. Optionally, the setting information of the model printer may be input/modified by the system administrator. The NVRAM 46 also stores a type of the printing device 2, which is controlled using the MIB.

The model flag indicates whether the printer functions as the model printer or not. The model flag is set to "Enabled" when the printer functions as the model printer, while the model flag is set to "Disabled" when the printer functions as the non-model printer. When the automatic setting flag is set to "Enabled", the printer changes the settings of itself based on the settings of the model printer. When the automatic setting flag is set to "Disabled", the printer does not set the settings of itself based on the settings of the model printer.

The function lock flag may be set when the printer operates as the model printer. Another printer can take over the function of the model printer when the function lock flag is set to "OFF". When the function lock flag is set to "ON", the function is locked and the currently set to the model printer keeps functioning as the model printer.

The settings of the automatic setting flag and function lock setting flag can be changed by the user and/or the system administrator. When such a change is requested, a check box and an indication which reads "Automatic Setting Based on the Model Printer" (which corresponds to the automatic setting flag) on the screen of the operation panel 45, and another check box and an indication saying "Maintain Function as the Model Printer" (which corresponds to the function lock flag) on the screen of the operation panel 45. The system administrator or the user changes/maintains the settings of the automatic flag and the lock flag by checking or unchecking the check boxes.

The interface 47 allows the printer 2 to connect with the LANs 7 and 17, and enables the printer 2 to communicate with other electronic devices such as the personal computers on the networks.

The CPU 41 executes various calculations and processing to control the entire operation of the printer 2. According to the first embodiment, the CPU 41 executes the model printer determining procedure (see FIG. 3).

The model printer determining procedure will be briefly described. In the following description, the printer which is to be set to a new model printer will be referred to as a candidate model printer. The CPU 41 of the candidate model printer executes a procedure for obtaining the model flags and function lock flags of the other printers in the model printer determining procedure. Then, the CPU 41 of the candidate model printer examines whether the printer which is currently set to function as the model printer (which will be referred to as a current model printer, and occasionally as a previous model printer for the sake of clarity) is on the LANs 7 and 17. When the CPU 41 of the candidate model printer determines that the current model printer is not on the network, it determines itself as the current model printer. When the CPU 41 determines that the current model printer is on the LANs 7 and 17, it determines one of the candidate model printer and the current model printer as a new current model printer.

In the decision of the new current model printer, the CPU 41 of the candidate model printer determines whether the lock flag of the current model printer is "ON". When the lock flag of the current model printer is "ON", the CPU 41 of the candidate model printer determines that the current model printer should be kept functioning as the current model printer. When the function lock flag of the current model printer is "OFF", the CPU 41 determines, based on the input through the operation panel 45, that the printer (i.e., the candidate printer of the current model printer) designated by the user as the new current model printer.

When the candidate model printer is designated as the model printer, the CPU 41 of the candidate model printer (which is now the current model printer) notifies that the candidate model printer is set to the current model printer to the other printers.

During the model printer determining procedure, the candidate model printer requests the current model printer to transmit the settings of the model flag and function lock flag, and the CPU 41 of the current model printer transmits the settings of the model flag and the function lock flag to the candidate model printer in response to the request. Further, when the CPU 41 of the previous model printer receives that the notification from the candidate model printer that the candidate model printer is set to the current model printer, the CPU 41 of the previous model printer sets the model flag thereof to "Disabled" to release the function as the model printer.

Figure 3:
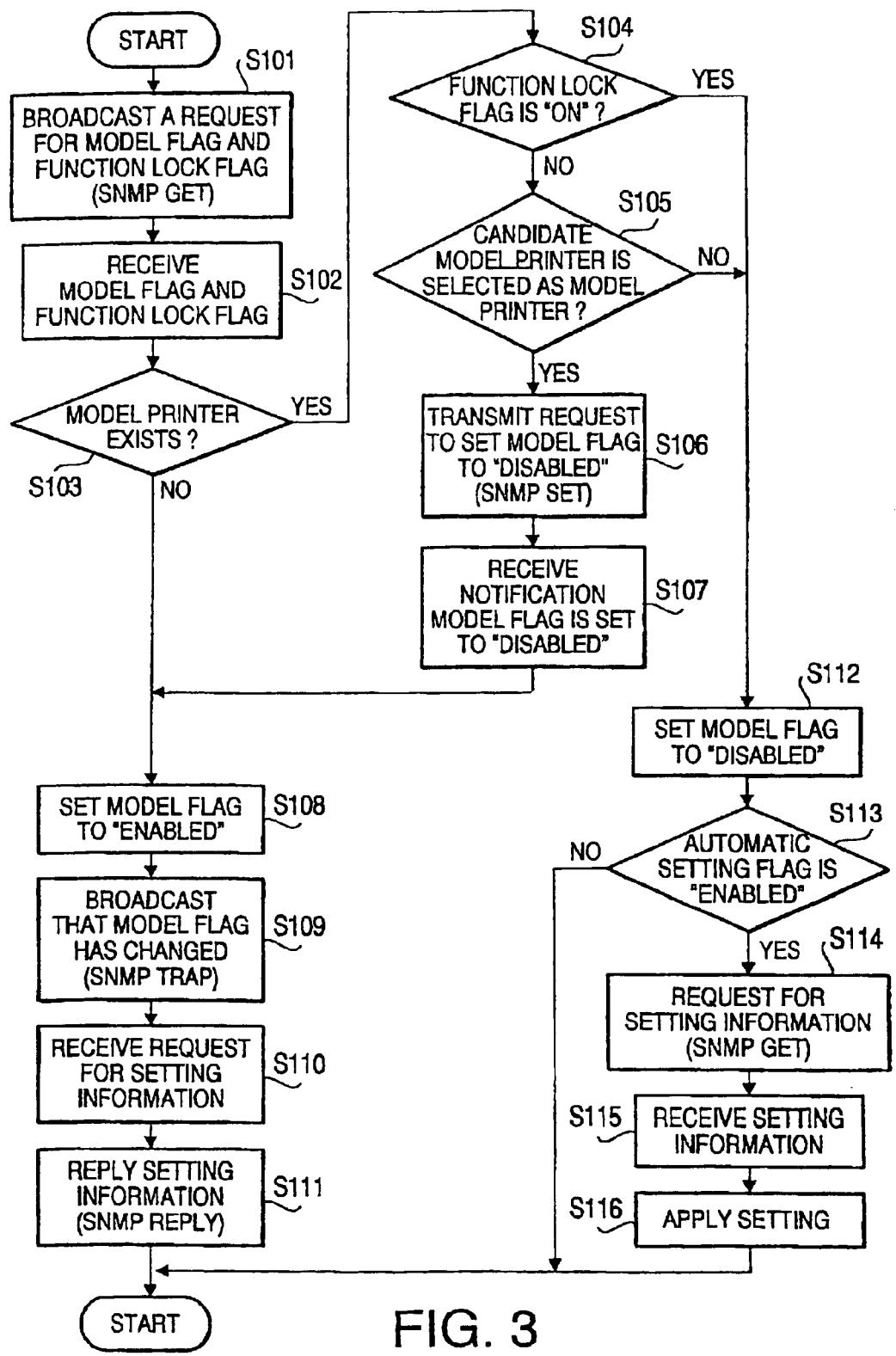
FIG. 3 is a flowchart illustrating a model printer determining procedure according to a first embodiment.

Hereinafter, the model printer determining procedure will be described in detail with reference to FIG. 3, which shows a flowchart of the model printer determining procedure. It should be noted that the procedure shown in FIG. 3 is executed by the CPU 41 of the candidate model printer. In the description on the model printer determining procedure below, 2a denotes the candidate model printer, and 2b denotes the current (or previous) model printer.

In S101, the candidate printer 2a is controlled by the CPU 41a to broadcast a request for setting (i.e., "Enabled" or "Disabled") of the model flag and setting (i.e., ON or OFF) of the function lock flag.

Each of the electronic devices (i.e., the printers 2b, 2c, 2d etc.) on the LAN 7 sends, in response to the request from the candidate printer 2a, the settings of the model flag and function lock flag using the REPLY command of the SNMP. In S102, the candidate printer 2a obtains the settings of the model flag and the function lock flag of the other printers on the LAN 7.

In S103, the CPU 41a of the candidate printer 2a determines whether a printer (e.g., 2b) having the same machine name and functioning as the model printer exists on the LAN7, with which the candidate printer 2a is also connected.

When the CPU 41a determines that such a printer (i.e., the current model printer) 2b exists (S103: YES), control proceeds to S104. When the CPU 41a determines that the current model printer 2b does not exist on the LAN 7 (S103: NO), control proceeds to S108. It should be noted that whether the machine names are equal or not can be determined by obtaining the MIB which is used for managing the machine types. Alternatively, other similar information such as vender names or machine type codes may be used instead of the machine names.

In S104, the CPU 41a of the candidate printer 2a determines whether the function lock flag of the current model printer 2b is set to "ON", i.e., whether the current model printer 2b is set to keep functioning as the model printer, based on the setting of the function lock flag obtained in S102. When the function lock flag of the current model printer 2b is "ON" (S104: YES), control proceeds to S112. When the function lock flag of the current model printer 2b is "OFF" (S104: NO), control proceeds to S105.

In S105, the CPU 41 executes a processing for displaying an image asking the system administrator to select the candidate printer 2a or the current model printer 2b as the new model printer on the screen of the operation panel 45a. Then, the system administrator selects the printer to function as the model printer through the operation panel 45a. The CPU 41a receives the signal from the operation panel 45 and determines whether the candidate printer 2a is designated as the model printer.

When the CPU 41a determines that the candidate printer 2a is designated as a printer to function as the model printer (S105: YES), control proceeds to S106. When the candidate printer 2a has not been designated as the model printer, i.e., the current model printer has been designated as the model printer 2b (S105: NO), control proceeds to S112.

In S106, the CPU 41a controls the candidate printer 2a to request the current model printer 2b to change the model flag to "Disabled" using the SET command of the SNMP.

The current model printer 2b sets the model flag to "Disabled" in response to the request transmitted from the candidate printer 2a (i.e., the current model printer 2b is no longer the model printer, and will be referred to as the previous model printer 2b). Then, the previous model printer 2b informs the candidate printer 2a that the model flag thereof is set to "Disabled" using the REPLY command of the SNMP. In S107, the candidate printer 2a receives the information indicating that the model flag of the previous model printer 2b is set to "Disabled".

In S108, the CPU 41a set the model flag of the candidate printer 2a to "Enabled", thereby the candidate printer 2a functions as the current model printer. Hereafter, the newly set model printer will be referred to a new model printer.

In S109, the new model printer 2a broadcasts, under control of the CPU 41a, a notification indicating that the model printer has changed using an enhanced TRAP command of the SNMP. It should be noted that the data broadcast is an enhanced TRAM command which has an enhanced description part indicating the change of the model printer.

Among the printers 2b, 2c and 2d having the same machine name as that of the new model printer 2a, ones whose automatic setting flags are "Enabled" request the new model printer 2a for the setting information using a GET command of the SNMP. In S110, the new model printer 2a receives such a request for the setting information from the printers on the LAN 7.

In S111, the new model printer 2a sends, under control of the CPU 41a, the information to be transmitted using the GET REPLY command of the SNMP.

As a exemplary procedure of S111, the following may be employed. That is, the setting information is created based on the parameter settings of the new model printer 2a in advance, and the setting information is sent upon receipt of the request for the setting information from other printers. Alternatively, the setting information may be generated after the request for the same is received, and then the created setting information is sent to the other printers.

Each printer, which receives the setting information from the new model printer 2a, updates its settings in accordance with the received setting information.

As described above, when the administrator or the user designated the current model printer as the model printer (i.e., the current model printer is to be used as the model printer) (S105: NO), control proceeds from S105 to S112. In S112, the CPU 41a of the candidate model printer 2a sets the model flag thereof to "Disabled" since it is not designated as the model printer. In this case, the current model printer 2b is kept functioning as the model printer. Since the candidate printer 2a does not function as the model printer as described above, more than one model printers will not exist simultaneously on the LAN 7.

In S113, the CPU 41a of the candidate printer 2a, which was not designated as the model printer, determines whether the automatic setting flag is "Enabled". When the automatic setting flag is not "Enabled" (S113: Disabled), the setting thereof will not be changed based on the setting information of the current model printer 2b. When the automatic setting flag is "Enabled" (S113: Enabled), control proceeds to S114.

In S114, the printer 2a which was the candidate printer requests, under control of the CPU 41a, the current model printer 2b for the setting information using the GET command of the SNMP. Then, the current model printer 2b transmits the setting information thereof to the candidate printer 2a using the REPLY command of SUMP.

In S115, the printer 2a receives the setting information from the current model printer 2b. Then, in S116, the CPU 41a of the printer 2a changes the settings thereof in accordance with the setting information received from the current model printer.

Hereinafter, a sequence of the model printer determining procedure will be described.

Figure 4:
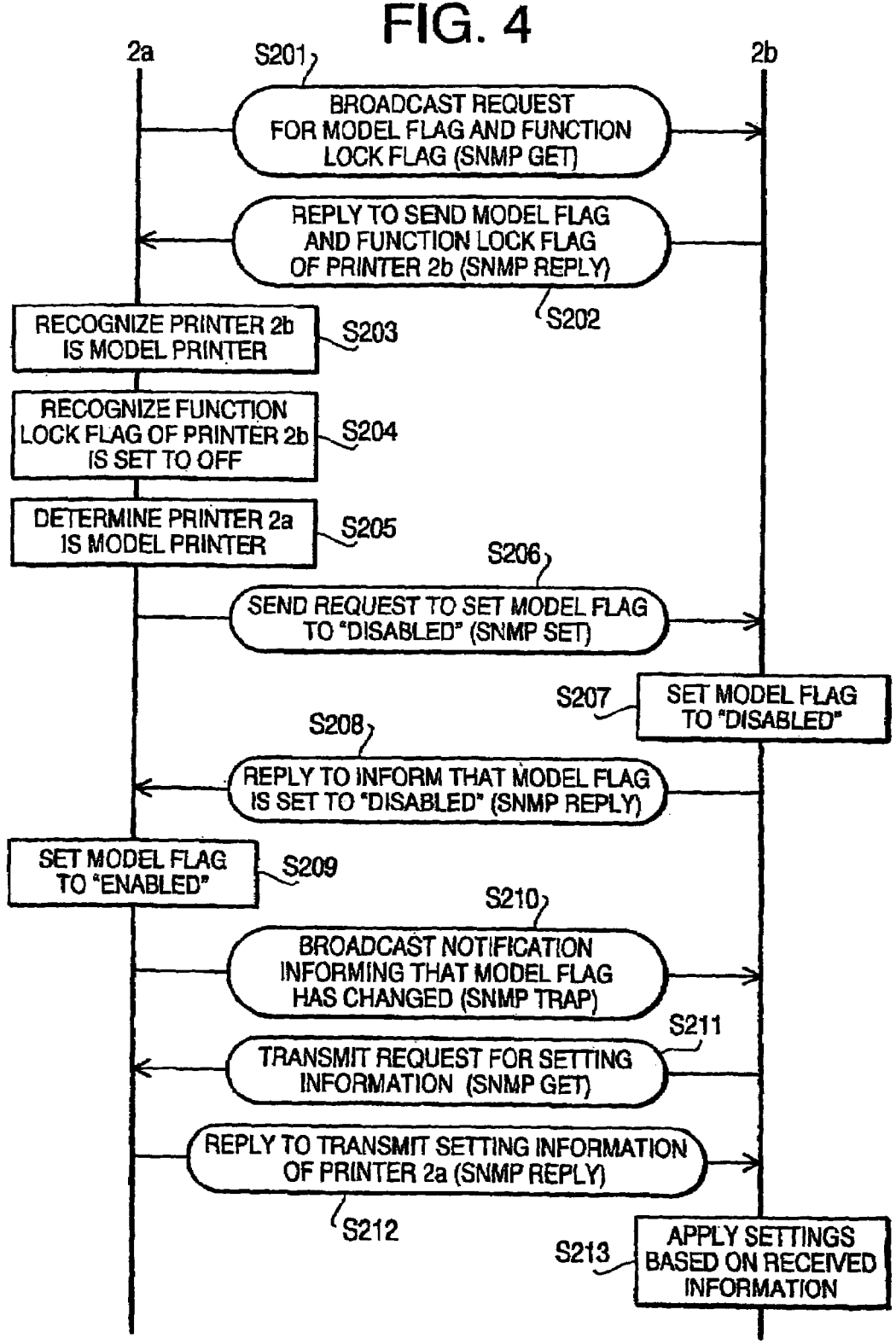
FIG. 4 shows a sequence of the model printer determining procedure according to the first embodiment.

FIG. 4 an example of a procedure sequence when a candidate printer is set to be a model printer. As in the foregoing description, the candidate printer is represented by 2a, and the current model printer is represented by 2b. In this example, the function lock flag of the current model printer is "OFF".

When the candidate printer 2a is powered ON, it broadcasts, under control of the CPU 41a, a request for settings of the model flag and the function lock flag (S201 which corresponds to S101 of FIG. 3). The printer 2b, under control of the CPU 41b, transmits the setting of the model flag (i.e., Enabled) and the setting of the function lock flag (i.e., OFF) to the printer 2a in response to the request (S202). Then, the printer 2a receives the setting of the model flag and the function lock flag (corresponding to S102 of FIG. 3).

The CPU 41a of the candidate printer 2a then recognizes, based on the setting of the model flag as received, that the printer 2b functions as the model printer (S203 which corresponds to S103 of FIG. 3). Then, the CPU 41a of the printer 2a recognizes that the function lock flag of the printer 2b is "OFF" (S204 which corresponds to 5104 of FIG. 3). In S205 (which corresponds to S105 of FIG. 3), the CPU 41a determines, based on the designation by the system administrator or the user, that the candidate printer 2a is to be used as the model printer.

The candidate printer 2a, then, requests the current model printer 2b to change the model flag to "Disabled" (S206 which corresponds to S106 of FIG. 3). The CPU 41b of the current model printer 2b, which receives the request from the printer 2a, changes the model flag thereof to "Disabled" (S207). Then, the printer 2b transmits, under control of the CPU 41b, a reply indicating the model flag has been changed to "Disabled" to the candidate printer 2a (S208). The candidate printer 2a receives the reply (corresponding to S107 of FIG. 3). After receiving the reply, the CPU 41a of the candidate printer 2a sets the model flag thereof to "Enabled" (S209 which corresponds to S108 of FIG. 3). Hereinafter, the candidate printer 2a, which now functions as the model printer will be referred to as a new model printer.

The new model printer 2a broadcasts, under control of the CPU 41a, a notification indicating the change of the model flag (S210 which corresponds to S109 of FIG. 3). The previous model printer 2b, which receivers the notification, requests, under control of the CPU 41b, the new model printer 2a for the setting information (S211).

The printer 2a transmits, under control of the CPU 41a, the setting information to the previous model printer 2b (S212 which corresponds to S111 of FIG. 3). The CPU 41b of the previous model printer 2b changes the settings of the previous model printer 2b based on the setting information transmitted from the new model printer 2a (S213).

Figure 5:
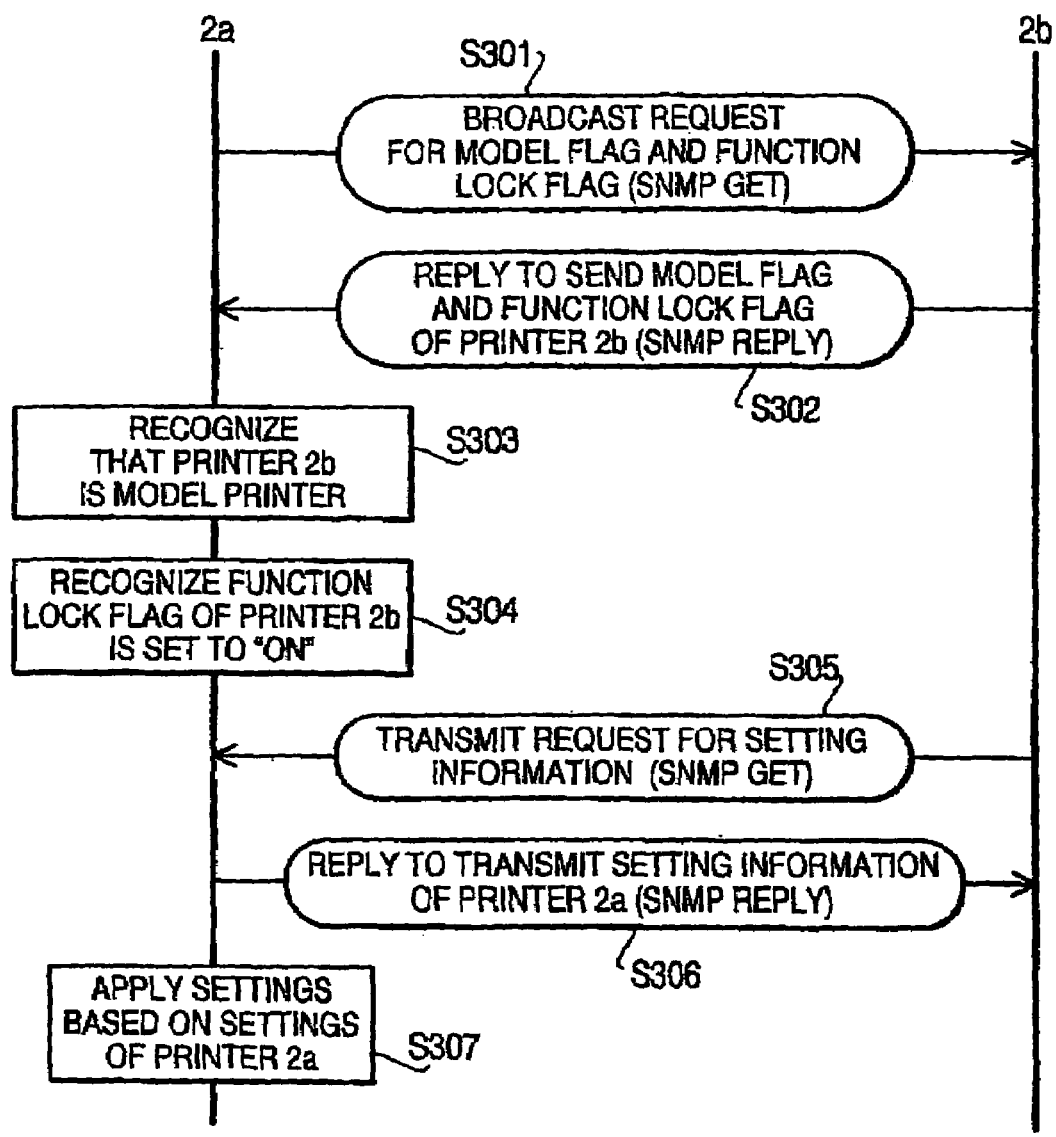
FIG. 5 shows another sequence of the model printer determining procedure according to the first embodiment.

Next, the operation sequence shown in FIG. 5 will be described. FIG. 5 shows an exemplary case where the candidate printer 2b has not been designated as the model printer. In the description on FIG. 5 below, the candidate printer is represented by 2a, and the current model printer is represented by 2b. Further, in this example, the function lock flag of the current printer 2b is "ON".

When the candidate printer 2a is powered ON, the printer 2a broadcasts, under control of the CPU 41a, a request for the settings of the model flag and the function lock flag (S301 which corresponds to S101 of FIG. 3). The current model printer 2b sends, under control of the CPU 41b, a replay including the setting of the model flag (i.e., "Enabled") and the setting of the function lock flag (i.e., "ON") to the candidate printer 2a in response to the request (S302). The candidate printer 2a thus receives the settings of the model flag and the function lock flag of the current model printer 2b (corresponding to S102 of FIG. 3).

The CPU 41a of the candidate printer 2a recognizes, based on the setting information received from the current model printer 2b, that the printer 2b functions as the model printer (S303 which corresponds to S103 of FIG. 3). Further, the CPU 41a recognizes that the lock flag of the printer 2b is "ON" (S304 which corresponds to S104 of FIG. 3).

The candidate printer 2a requests the current model printer 2b, under control of the CPU 41a, for the setting information thereof (S305 which corresponds to S114 of FIG. 3). The current model printer 2b, which receives the request for the setting information, transmits the setting information thereof to the candidate printer 2a (S306), and the candidate printer 2a receives the setting information of the current model printer 2b (corresponding to S115 of FIG. 3). When the candidate printer 2a receives the setting information of the current model printer 2b, the CPU 41a changes the settings of the printer 2a based on the received setting information of the current model printer 2b (S307 which corresponds to S116 of FIG. 3).

In the above-described first embodiment, when a printer is to operate as a model printer, it is firstly examined whether there is a printer functioning as the model printer on the LAN 7. If there is no model printer on the LAN 7, the model flag of the candidate printer is set to "Enabled" so that it functions as the model printer. If there is a model printer (i.e., the current model printer) on the LAN 7 and its function lock flag is "OFF", one of the candidate printer and the current model printer is selected by the system administrator or the use. Then, the model flag of the printer as selected is set to "Enabled" so that it functions as the model printer, while the model flag of the printer which is not designated by the system administrator is set to "Disabled", thereby only one printer is set to function as the model printer and the other printer(s) does not function as the model printer. According to the above configuration, only one model printer exists on the LANs 7 and 17, and when the non-model printers change/update the settings based on the settings of the model printer, the setting information can be obtained easily.

When the function lock flag of the current model printer is set to "ON", the previous printer is kept functioning as the model printer. Thus, when the system administrator intends to use a predetermined printer as the model printer, the management thereof can be made easily, and the predetermined printer is kept being used as the model printer.

If the function lock flag of the current model printer is "OFF", another printer designated by the system administrator is set as the model printer. Thus, the model printer can be changed relatively easily.

Further, if the model printer is changed, it is notified (broadcast) to the other printers on the network, and therefore, the settings of the other printers can be changed immediately in accordance with the settings of the new model printer.

Figure 6:
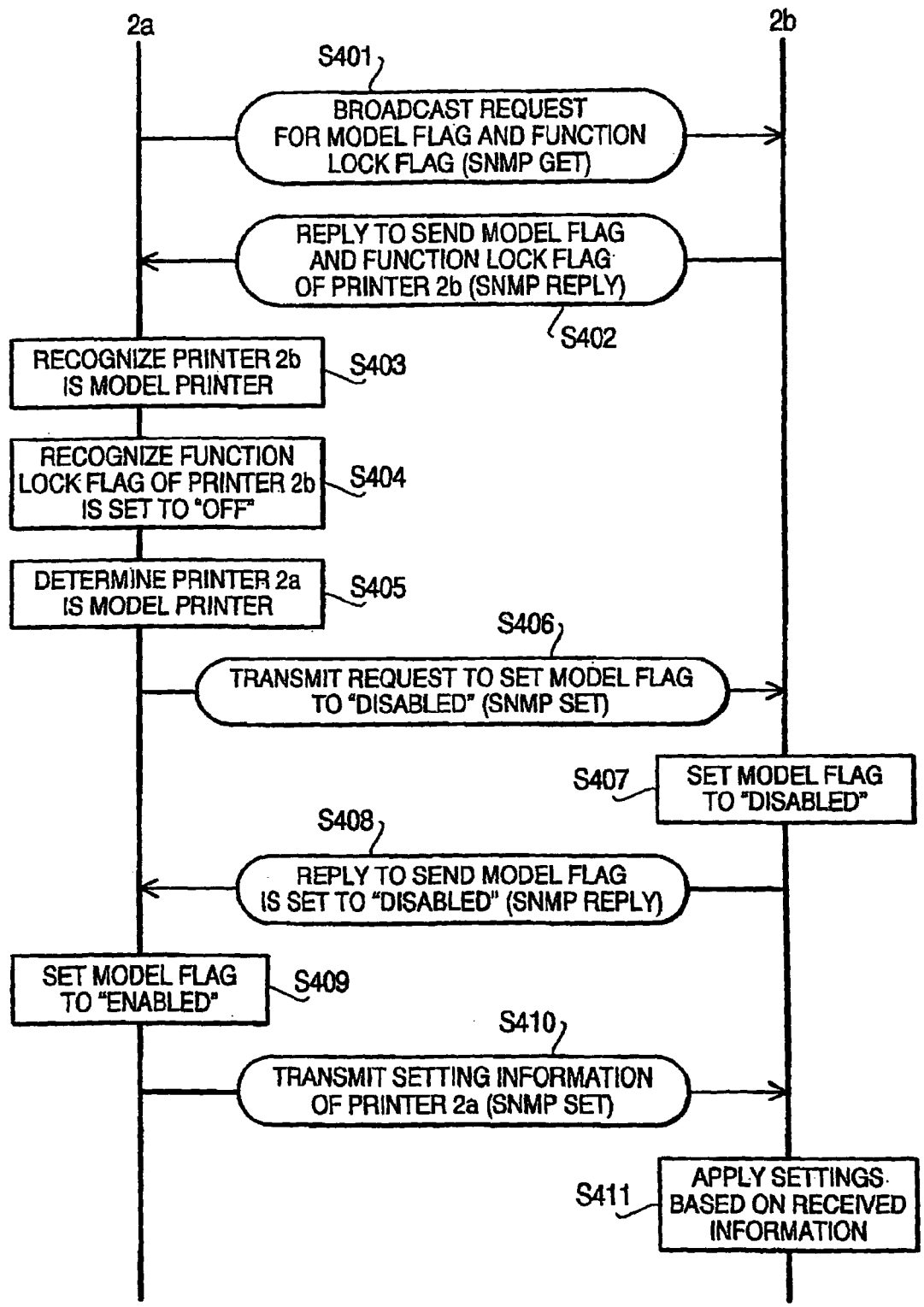
FIG. 6 shows another exemplary sequence of the model printer determining procedure according to the first embodiment.

Next, a modification of the sequence shown in FIG. 4 will be described with reference to FIG. 6.

In this example, the candidate printer is to be set to function as the model printer. Similarly to the description on the first embodiment, the candidate printer is represented by 2a, and the current model printer is represented by 2b, whose function lock flag is set to "OFF".

When the printer 2a is powered ON, the printer 2a broadcasts a request for the setting of the model flag and the setting of the function lock flag, under control of the CPU 41a. The current model printer 2b transmits, in response to the request and under control of the CPU 41b, the setting of the model flag (i.e., Enabled) and the setting of the function lock flag (i.e., "OFF") to the candidate printer 2a (S402). The candidate printer 2a receives the thus transmitted settings of the model flag and the function lock flag of the current model printer 2b.

The CPU 41a of the candidate printer 2a recognizes, based on the received setting of the model flag, that the printer 2b functions as the model printer (S403). Further, the CPU 41a recognizes that the function lock flag of the printer 2b is "OFF" (S404). In this example, the administrator/user designates the candidate printer 2a as the printer to operate as the model printer. Thus, the CPU 41a determines that the printer 2a is the model printer based on the designation by the system administrator or the user (S405).

The candidate printer 2a requests, under control of the CPU 41a, the current model printer 2b to change the model flag to "Disabled" (S406). The CPU 41b sets the model flag of the current model printer 2b to "Disabled" as requested (S407), and then the printer 2b sends a notification, under control of the CPU 41b, informing that the model flag thereof has been set to "Disabled" to the printer 2a (S408). Hereinafter, the printer 2b will be referred to as the previous model printer 2b. The candidate printer 2a receives the notification. After the candidate printer 2a received the notification that the model flag of the previous model printer 2b is set to "Disabled", the CPU 41a changes the model flag of the candidate printer 2a to "Enabled" (S409). Hereinafter, the printer 2a will be referred to as the new model printer 2a.

The new model printer 2a transmits the settings thereof under control of the CPU 41a (S410) to the previous model printer 2b. When the printer 2b received the setting information of the new model printer 2a from the new model printer 2a, the CPU 41b changes the settings of the previous model printer 2b based on the received setting information of the new model printer (S411).

According to the modification above, the effect similar to the first embodiment can be obtained.

Second Embodiment

Hereinafter, a second embodiment will be described. In the following description, different portions with respect to the first embodiment will be mainly described.

According to the second embodiment, in the ROM 42 (42a, 42b, . . . ), a program which is executed by the printer to realize a model function releasing procedure (see FIGS. 7 and 8) is stored. The model function releasing procedure releases the model printer function when the printer is connected to another LAN. The NVRAM 46 (i.e., the NVRAM 46a, 46b, . . . ) stores an IP address update check table, an example of which is shown in FIG. 9. In the IP address update check table, an IP address (the previous IP address) which was obtained in a model flag updating procedure (FIG. 8: S602) previously executed is registered.

Figure 7:
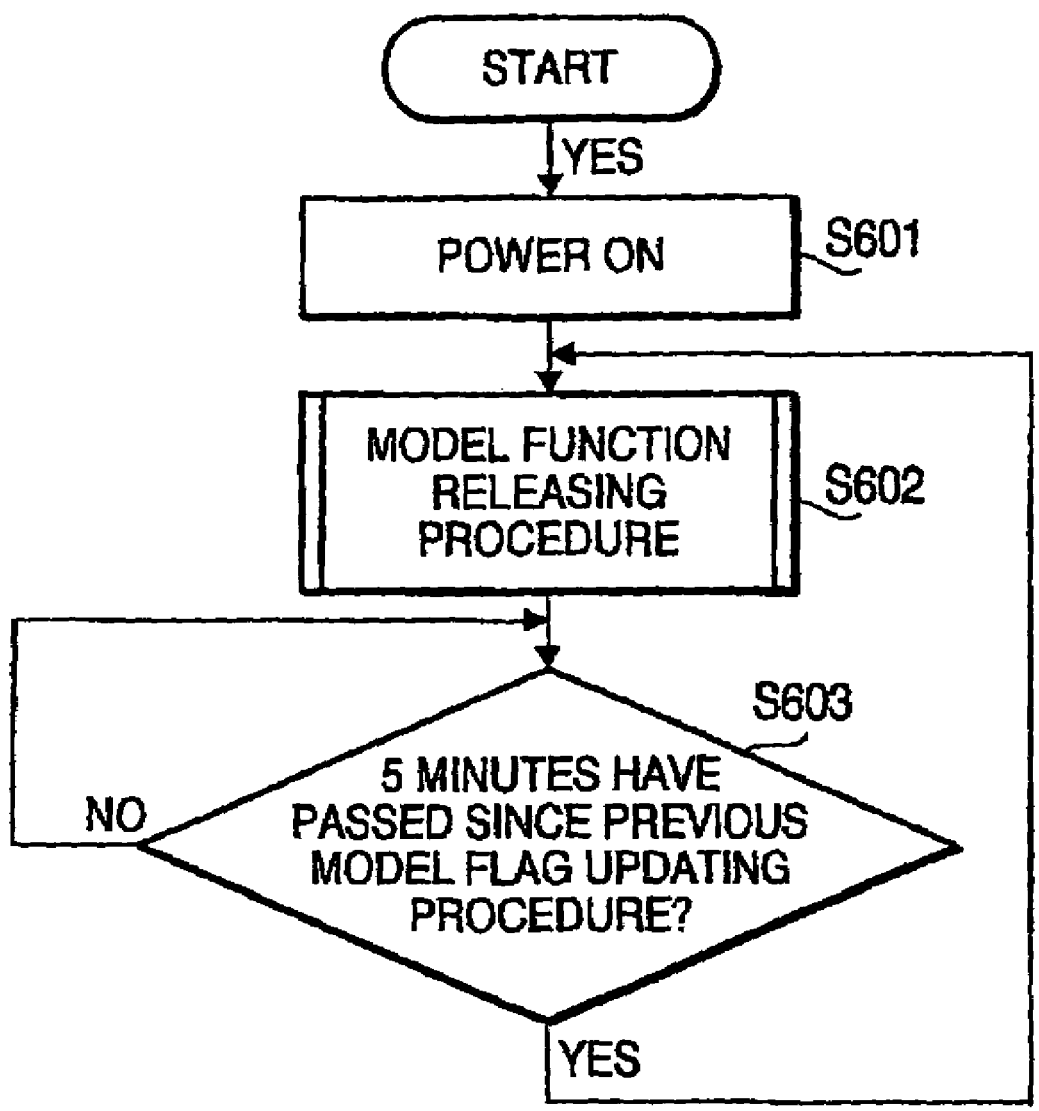
FIG. 7 is a flowchart showing a model function releasing procedure according to a second embodiment of the invention.
Figure 8:
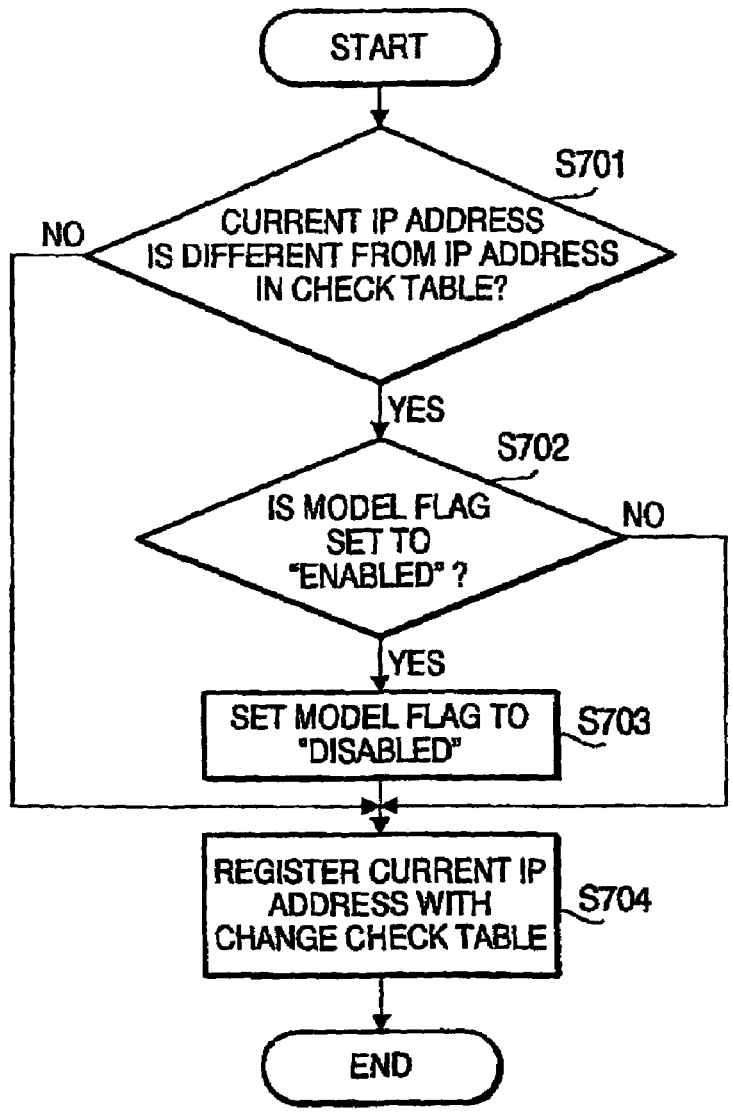
FIG. 8 is a flowchart illustrating a model flag correcting procedure which is called in the model function releasing procedure shown in FIG. 7.
Figure 9:
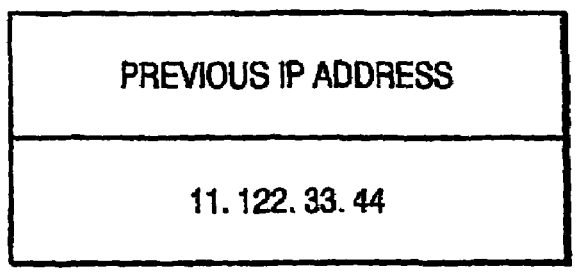
FIG. 9 shows an example of an IP address change table.

The CPU 41 (41a, 41b, . . . ) executes the model function releasing procedure (see FIGS. 7 and 8). The operation of the CPU 41 will be briefly described.

In the model function releasing procedure, the CPU 41 compares the current IP address and the previous IP address which is stored in the IP address update check table at every five minutes. If the two IP addresses are different, the CPU 41 determines that the printer is connected to another LAN. In such a case, the CPU 41 set the model flag to "Disabled" and releases the model function.

Next, with reference to FIGS. 7 and 8, the model function releasing procedure executed in the network system 1 will be described in detail. FIG. 7 is a flowchart illustrating a main procedure of the model function releasing procedure. FIG. 8 shows a flowchart of the model flag updating procedure, which is called in the main procedure shown in FIG. 7. In this example, the candidate printer is represented by 2a.

In S601, when the printer 2a is powered ON, the CPU 41a of the printer 2a calls the model flag updating procedure in S602, which will be described in detail later. During the model flag updating procedure, when the printer 2a is considered to be connected with another LAN, the model flag of the printer 2a is set to "Disabled". In S603, the CPU 41a determines whether five minutes have passed since the previous model flag updating procedure (S602) was executed based on the signal output by the timer. When the CPU 41a determines that five minutes have not yet passed (S603: NO), the CPU 41a keeps checking the status. When the CPU 41a determines that five minutes have passed (S603: YES), control returns to S602 and the model flag updating procedure is executed. It should be noted that the period between executions of the model flag updating procedure need not to limited to five minutes, but is set an arbitrary value in accordance with the configuration of the network system.

In the model flag updating procedure, the CPU 41a determines whether the current IP address and the previous IP address registered with the IP address update check table in the NVRAM 46a are same or different. When the CPU 41a determines that the two IP addresses are different (S701: YES), control proceeds to S702. When the CPU 41a determines that the two IP addresses are the same (S702: NO), control proceeds to S704.

In S702, the CPU 41a determines whether the model flag of the printer 2a is "Enabled". When the CPU 41a determines that the model flag of the printer 2a is set to "Enabled" (S702: Enabled), control proceed to S703. When the model flag is not set to "Enabled" (i.e., the model flag is "Disabled") (S702: Disabled), control proceeds to S704.

In S703, the CPU 41a changes the model flag thereof from "Enabled" to "Disabled", and control proceeds to S704. With this change, the model function of the printer 2a, which has been functioning as the model printer and is now considered to be connected with another LAN, is released.

In S704, the CPU 41a replaces the content of the IP address update check table as exemplified in FIG. 9 with the present IP address.

In the above-described second embodiment, when the IP address of the printer is changed and the printer is considered to be connected with another LAN, the model flag is changed to "Disabled" so that the function of the model printer is released. Accordingly, the printer which functions as the model printer in a previously connected LAN is connected to another LAN, its model printer function is released. Thus, even if a model printer is already on the newly connected LAN, there will not be more than one model printers on the LAN. As a result, the printers on the LAN can obtain the setting information correctly.

Third Embodiment

Hereinafter, a third embodiment will be described. In the third embodiment, the model flag updating procedure is different from that employed in the second embodiment.

Figure 10:
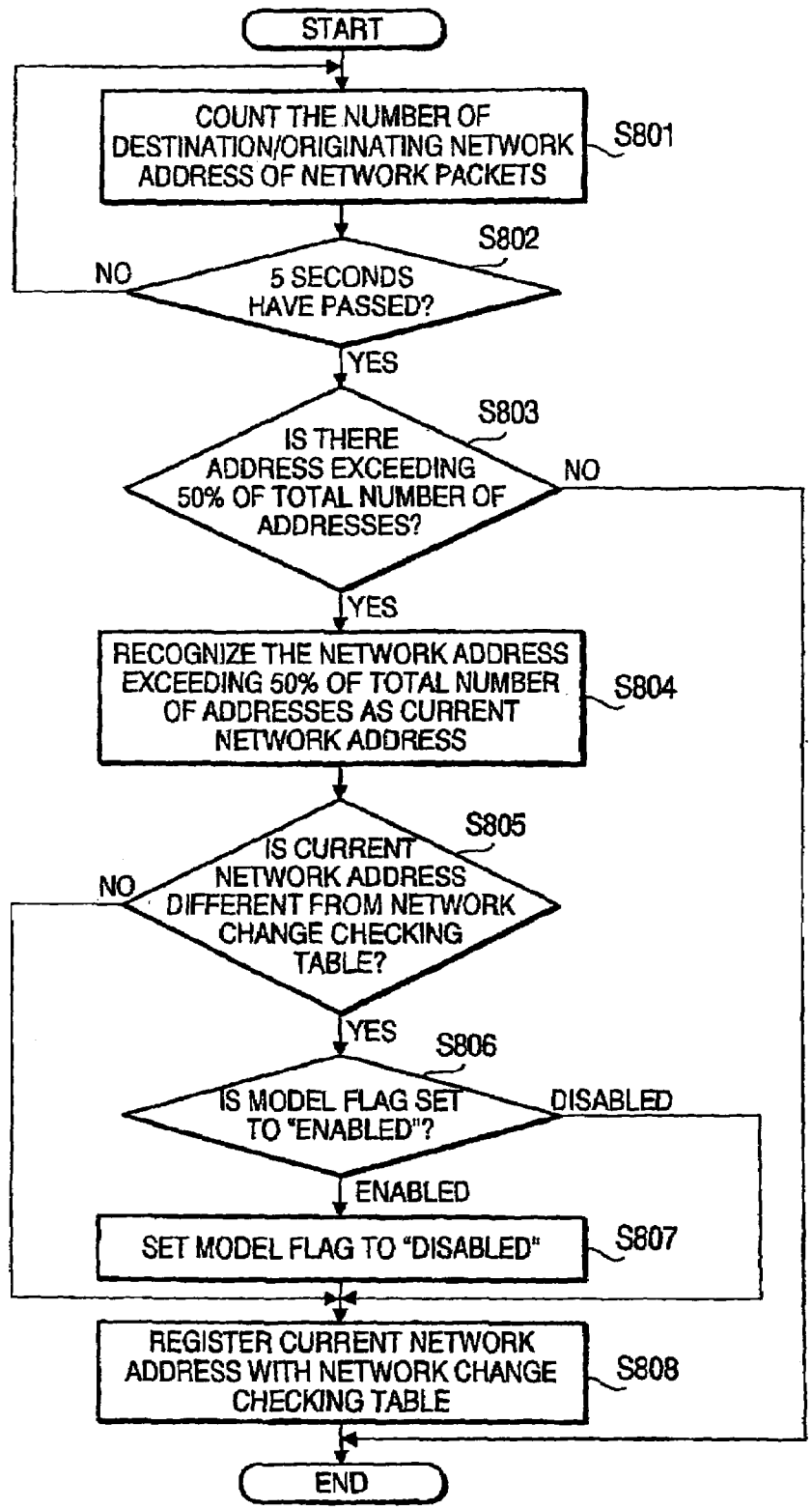
FIG. 10 is a flowchart showing a model flag correcting procedure according to a third embodiment.

According to the third embodiment, the ROM 42 (42a, 42b, . . . ) stores a program which is executed in the printer to perform a model function releasing procedure (see FIGS. 7 and 10). The NVRAM 46 (46a, 46b, . . . ) stores a network change check table, an example of which is shown in FIG. 11.

In the network change check table, the network address of the IP address obtained in the previous model flag updating procedure (FIG. 1: S602) is registered. Further, the RAM 43 (43a, 43b, . . . ) stores a network address counter table, an example of which is shown in FIG. 12.

The network address counter table is used for counting the originating/destination network addresses of transmitted/received network packets.

According to the third embodiment, the CPU 41 (41a, 41b, . . . ) executes a model printer releasing procedure (FIGS. 7 and 10). The operation of the CPU 41 (41a, 41b, . . . ) when the model function releasing procedure will be briefly described. In the model function releasing procedure, according to the third embodiment, the CPU 41 compares the network address which exceeds 50% of the network address counter table (FIG. 12) and the previous network address registered in the network change check table (FIG. 11) at every five minutes. If the compared network addresses are different, the CPU 41 determines that the printer is connected to another LAN. In such a case, the CPU 41 changes the model flag to "Disabled", thereby the function as the model printer being released.

Hereinafter, the model function releasing procedure according to the third embodiment will be described with reference to FIG. 10. FIG. 10 is a flowchart illustrating the model flag updating procedure called in FIG. 7. It should be noted that the main procedure (i.e., FIG. 7) is similar to that of the second embodiment. The candidate printer is represented by 2a.

In S801, the CPU 41a increments a value of the network address in a network address counter as shown in FIG. 12 based on the network addresses of the originating/destination network address of the received/transmitted network packets. If the network address is not included in the network address counter table, the network address is added in the network address counter table, and the counting value thereof is set to one. Alternatively, only one of the received and transmitted network packets is referred to when the network address count table is updated.

In S802, the CPU 41a of the printer 2a determines whether five seconds have passed since the model flag correcting procedure was started based on a signal from a not-shown timer. When five seconds have not passed (S802: NO), control returns to S801. When the CPU 41a determines that five seconds have passed (S802: YES), control proceeds to S803.

In S803, the CPU 41a determines whether there is a network address the counter of which exceeds 50% of the sum of the counted numbers of the network addresses in the network address counter table shown in FIG. 12. When the CPU 41a determines that any one of the counters shows less than 50% of network addresses (S803: NO), the model flag updating procedure is terminated. When the CPU 41a determines that there is an address whose counter shows 50% or more of the sum of the counters of the network addresses (S803: YES), control proceeds to S804.

In S804, the CPU 41a approves the network address whose counter exceeds 50% of the sum of the counted numbers of the network addresses is the network address of the LAN to which the printer 2a is currently connected.

In S805, the CPU 41a determines whether the network address as approved in S804 and the previous network address registered in the network change check table shown in FIG. 11 are different. When the CPU 41a determines that the two addresses are the same (S805: NO), control proceeds to S808. When the CPU 41a determines that the two addresses are different (S806: YES), control proceeds to S806.

In S806, the CPU 41a determines whether the model flag of the printer 2a is "Enabled". When the model flag is "Enabled" (S806: Enabled), control proceeds to S807. When the model flag is not "Enabled" (S806: Disabled), control proceeds to S808.

In S807, the CPU 41a replaces the content of the network change check table with the network address approved in S804 so as to be used in the next execution of the model flag updating procedure.

In the third embodiment, when the network address of the network printer transmitted/received by the printer is changed, and the printer is considered to be connected with another LAN, the model flag is set to "Disabled" so that the function of the model printer is released. Therefore, even if there is a model printer on the LAN to which the printer is newly connected, there will not be more than one printers on the LAN. Thus, each of the printers on the LAN can obtain the setting information from the model printer easily.

The present invention need not be limited to have the above-described configurations, and can be modified without departing from the scope of the invention.

For example, in the first embodiment, the SNMP is used. However, the invention need not be limited to one using the SNMP, and, another protocol such as UPnP (Universal Plug and Play), which can exchange information (e.g., model flag and function lock flag) with other electronic devices on the LAN may be employed.

When the UPnP is used, the candidate printer searches for other printers in accordance with the Discovery command of the UPnP. After the search, using the Description command, the settings of the model flag and the function lock flag of other printers are obtained. Then, in accordance with the thus obtained settings, as in the first embodiment, whether the candidate printer is to function as the model printer is determined. When it is determined that the candidate printer is to function as the model printer, a multicast notification is transmitted for notifying the same (which is referred to as and enhancement of SSDP: Simple Service Discovery Protocol). An example of the data to be multicast is shown in FIG. 13.

In the data, "Notify*Http/1.1" indicates that the notification follows HTTP 1.1. "HOST:" indicates the address and port name to be used for the SSDP multicast. "LOCATION: http://" represents a URL indicating a location of the setting information (Description) of the model printer. "NT: upnp:rootdevice" represents that all the UPnP devices are destinations. "NTS: ssdp:modelchange" represents that the command indicates a model change (i.e., the model printer is changed). "SERVER" represents the type and version information of the printer, and UPnP version information.

The system may be configured such that there is only one model printer for all the printers.

Fourth Embodiment

Figure 14:
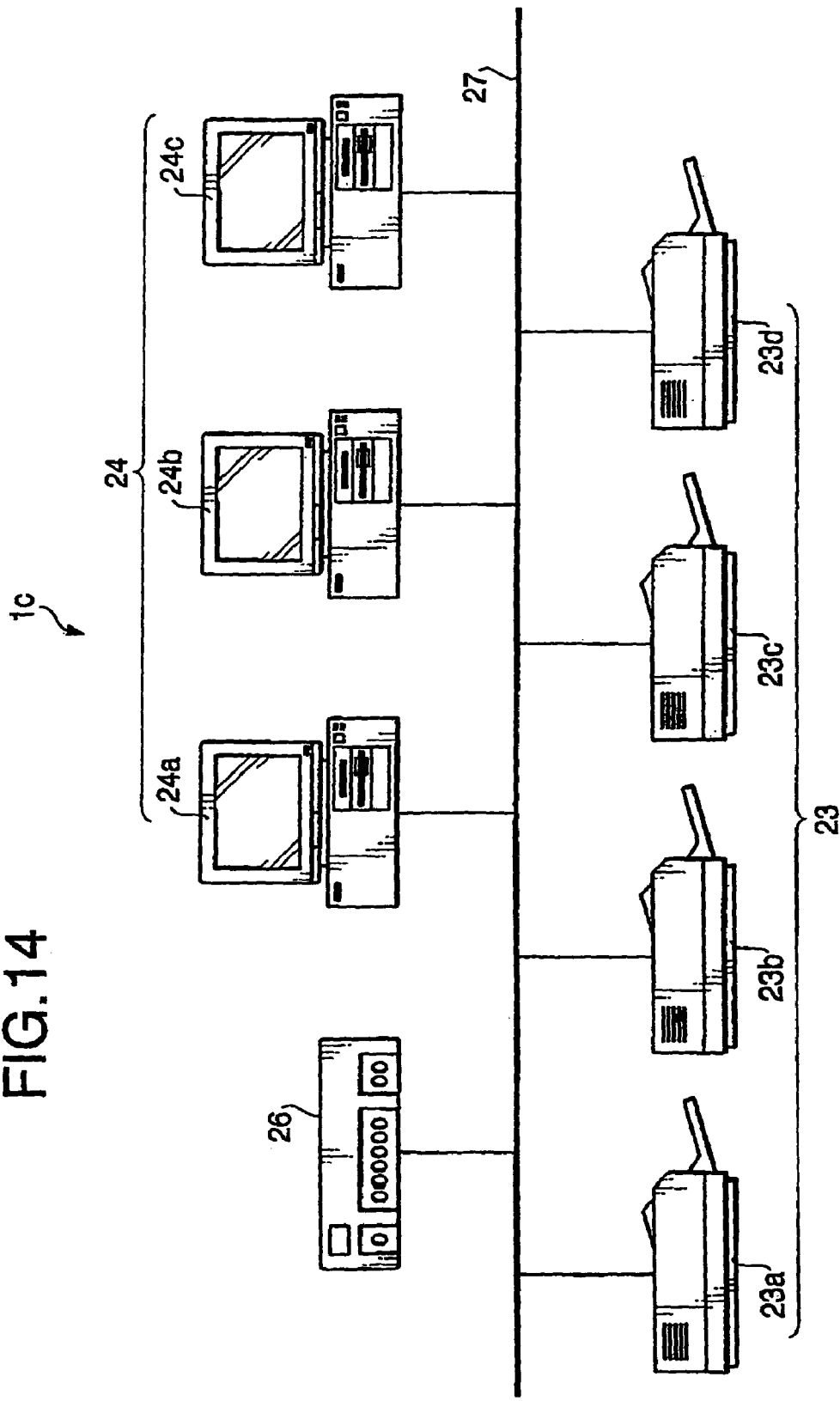
FIG. 14 shows an exemplary configuration of a network system according to a fourth embodiment of the invention.

Hereinafter, a fourth embodiment will be described. FIG. 14 shows an example of a network system according to the fourth embodiment.

The network system 1c shown in FIG. 14 includes printers 23 (23a, 23b, 23c and 23d), personal computers 24 (24a, 24b and 24c) and a router 26, which are connected to a LAN 27. The printers 23 and personal computers 24 are communicable through the LAN 27, and further, capable of exchanging data through the LAN 27 and the router 26, with electronic devices outside the network system 1c.

In the following description, a case where a model electronic device is a printer will be described.

Similarly to the above-described embodiments, the printers 23 and personal computers 24 are SNMP compatible devices.

Figure 15A:
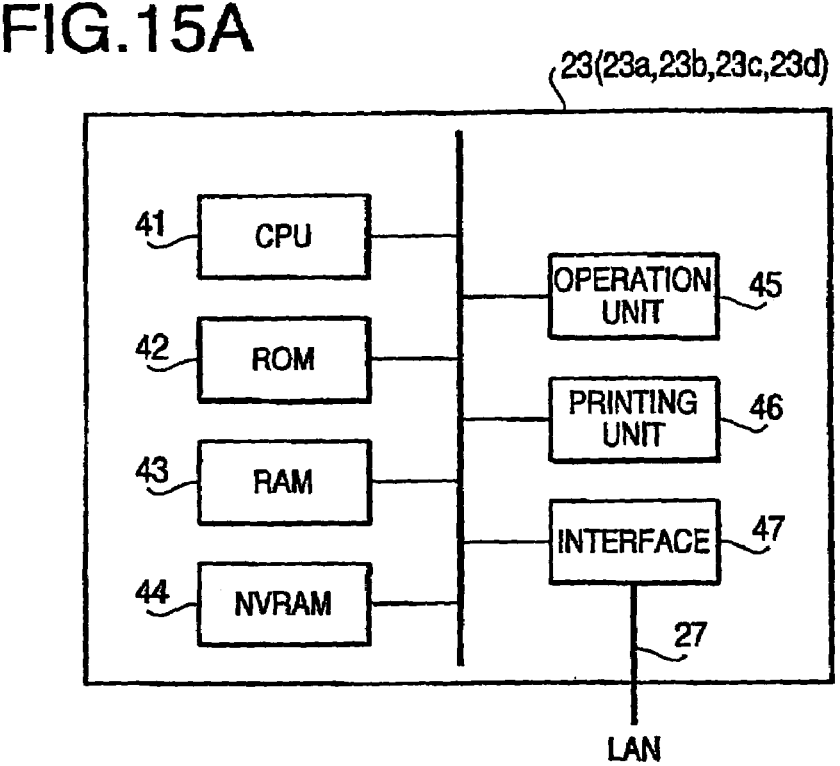
FIG. 15A is a block diagram showing an exemplary configurations of a printer, which is one of electronic devices connected to the network system.

FIG. 15A shows an exemplary configuration of the printer 24. As shown in FIG. 15A, and similarly to the first through third embodiments, the printer 24 includes the CPU 41, the ROM 42, the RAM 43, the printing unit 44, the operation panel 45, the NVRAM 46 and the interface 47 connected to the LAN 27. The ROM 42 stores programs corresponding to procedures shown in FIGS. 16A-16D and 17. The CPU 41 executes the programs stored in the ROM 42 when, for example, the printer 23 is powered on and is connected to the network 27 through the interface 47.

According to the fourth embodiment, NVRAM 46 stores a model flag ("Enabled" or "Disabled"), an automatic setting flag ("Enabled" or "Disabled") and a priority setting ("High" or "Low"). Further, the NVRAM 46 stores various parameters including a communication protocol, authorization data (for security), registration of various servers, language and time data). These parameters are transmitted from a model printer to non-model printers as setting information.

The model flag is used for indicating whether the printer functions as the model printer. If the model flag of a printer is set to "Enabled", the printer functions as the model printer. If the model flag is "Disabled", the printer is a non-model printer.

The automatic setting flag represents whether the settings of the printer should be made in accordance with the model printer. If the automatic setting flag is set to "Enabled", the operational settings of the printer should be made in accordance with those of the model printer. If the automatic setting flag is "Disabled", the settings of the printer are not made in accordance with the setting of the model printer.

The priority data is used to restrict the number of model printer on the network to one. If a previous model printer, which is different from a current model printer and was a model printer and disconnected from the network, is re-connected to the network, one of the previous model printer or the current model printer is selected as the model printer based on the priority data.

If the priority of the current model printer is "High" and that of the previous model printer is "High" or "Low", or if the priority of the current model printer is "Low" and that of the previous model printer is "Low", the current model printer is kept used as the model printer. That is, if the priority of the current model printer is the same or higher than that of the previous model printer, the current model printer is used as the model printer.

If the priority of the current model printer is "Low" and that of the previous model printer is "High", the previous model printer is used as the model printer, and the current model printer will not be used as the model printer. That is, if the current model printer has lower priority than the previous model printer, the previous model printer is used as the model printer, and the current model printer will not be used as the model printer.

According to the fourth embodiment, values of the automatic setting flag and the priority can be changed by a user. For example, an automatic setting flag setting window including a message "Automatic Setting Corresponding to the Model Printer enabled?" and a check box may be displayed on the display unit of the operation panel 45. Then, the user can set the automatic setting flag to "Enabled" or "Disabled" by checking or unchecking the check box through the operation panel 45. Such a setting window may be displayed when the user performs a predetermined operation through the operation panel 45.

Similarly, for example, a priority setting window including a message, "Do you want to change the priority" and a check box may be displayed on the display unit of the operation panel 45. In such a case, when the user input a check in the check box, the priority is set to "High" and when the user unchecks the heck box, the priority may be set to "Low". The priority setting window is displayed when the user performs a predetermined operation through the operation panel 45 on the printer which currently functions as the model printer.

Figure 15B:
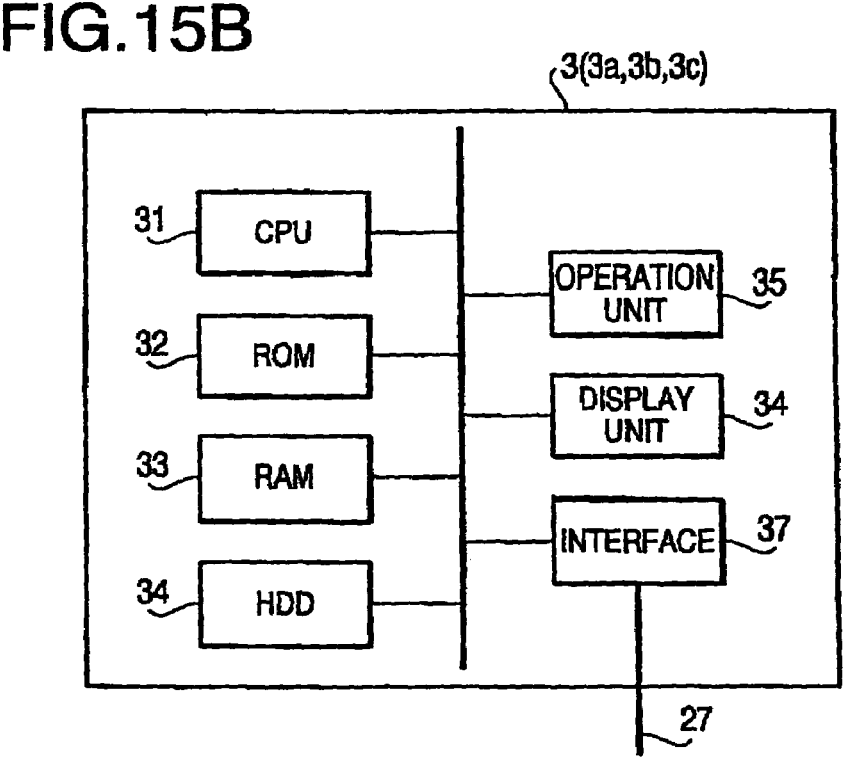
FIG. 15B is a block diagram showing an exemplary configurations of a personal computer connected to the network system shown in FIG. 14.

FIG. 15B shows an exemplary configuration of the personal computer 24. As shown in FIG. 15B, and similarly to the first through third embodiments, the personal computer 24 includes the CPU 31, the ROM 32, the RAM 33, the HDD 34, the operation unit 35, the display unit 36 and the interface 37.

Next, a setting procedure executed by the printers 23 will be described with reference to FIGS. 16A-16D and 17.

When the printer 23 is powered on, and when the printer 23 is connected to the LAN 27 (which is detected through the interface 47), the CPU 41 of the printer 23 reads the program stored in the ROM 22 and executes the procedures shown in FIGS. 16A-16D and 17.

In S1101, the CPU 41 determines whether the model flag stored in the NVRAM 46 is "Enabled". When the model flag represents "Enabled" (S1101: YES), control proceeds to S1102. When the model flag represents "Disabled" (S1101: NO), control proceeds to S1103.

In S1102, the CPU 41 controls the printer 23 to broadcast, through the network 27, that the printer, which previously functioned as the model printer, is connected to the LAN 27 (i.e., a participation of the printer which previously functioned as the model printer). In S1103, the CPU 41 determines whether the model flag stored in the NVRAM 46 represents "Disabled". When the model flag is "Disabled" (S1103: YES), control proceeds to S1104. When the model flag is not "Disabled", (i.e., the model flag is "Enabled") (S1103: NO), control proceeds to S1108.

In S1104, the printer 23 executes, under control of the CPU 41, a procedure checking that there exists a printer functioning as the model printer on the LAN 27. Then, control proceeds to S1105. The procedure in S1104 is executed, for example, by transmitting a request for the model flag to all the printers 23 on the LAN 27 (using GET command of SNMP) and receiving the response transmitted thereto (in accordance with the REPLY command of SNMP), and referring to the model flags informed with the response from each printer 23. Alternatively, by making use of the IP addresses of the printer functioning as the model printer, and checking whether a response to a ping command is received.

In S1105, the CPU 41 determines, based on the result of the checking in S1104, whether there is a printer functioning as the model printer on the LAN 27. When there is a model printer on the LAN 27 (S1105: YES), control proceeds to S1122. When there is no model printer on the LAN 27 (S1105: NO), control proceeds to S1106.

In S1106, the CPU 41 changes the model flag store in the NVRAM 46 from "Disabled" to "Enabled" so that the printer 23 functions as the model printer.

Once the printer 23 is set to function as the model printer, the user can operate the printer 23 to display the priority setting window described above and change the priority of the printer 23 between "High" and "Low".

In S1107, the CPU 41 broadcasts a notification indicating that the model printer has changed.

In S1108, the CPU 41 determines whether the notification of participation of the model printer is received through the interface 47. When a printer which previously functioned as the model printer was once disconnected from the LAN 27, and is connected again to the LAN 27, the procedure shown in FIGS. 16A-16D and 17 is executed in the previous model printer. Then, in S1102, the previous model printer broadcasts the notification of participation of the model printer since its model flag is set to be "Enabled". In S1108, it is determined whether such a notification is received through the interface 47.

When the CPU 41 determines that the notification of the participation of the model printer is received (S1108: YES), control proceeds to S1110. When the CPU 41 does not receive such a notification (S1108: NO), control proceeds to S1116.

In S1110, the printer 23 transmits, under control of the CPU 41, a request for the priority information to the previous model printer that broadcasts the notification of participation of the model printer (using GET command of SNMP). It should be noted that, in this request, the priority information stored in the NVRAM 46 of the current model printer 23 requesting the priority information is included. In response to the request, the previous model printer that notifies the participation of the model printer transmits the priority information stored in the NVRAM 46 thereof in S1116 and S1117 of the same procedure executed in the previous model printer (using REPLY command of SNMP).

In S1111, the CPU 41 receives the priority information, through the interface 47, from the previous model printer that notified the participation of the model printer, and control proceeds to S1112.

In S1112, the CPU 41 determines whether the priority of the previous model printer is higher than the priority of the current model printer to which the CPU 41 belongs. When the priority of the previous model printer is higher (S1112: YES), control proceeds to S1113. When the priority of the previous model printer is not higher than (i.e., equal to or lower than) the priority of the printer (S1112: NO), control proceeds to S1116.

In S1113, the CPU 41 set the model flag of the current model printer stored in the NVRAM 24 from "Enabled" to "Disabled", and control proceeds to S1114.

In steps S1110 through S1113 described above, the printer 23 currently operates as the model printer and receives the participation of model printer from another printer (i.e., the previous model printer) requests the previous printer for the priority information thereof. When the priority of the previous model printer is higher, the model flag of the current model printer 23 is changed from "Enabled" to "Disabled" so that the printer whose priority is not higher does not operate as the model printer. In this case, the previous model printer is to operate as the model printer. The setting of the model flag of the previous model printer is executed in the procedure executed in the previous model printer.

If the priority of the current model printer 23 is equal to or higher the priority of the previous model printer (S1112: YES), it keeps operating as the model printer. In this case, the previous model printer which notified the participation of the model printer changes the settings thereof so as not to operate as the model printer in S1118 and S1119 of the procedure executed in the other printer, which will be described later.

In S1114, the printer 23 transmits, under control of the CPU 41, the settings thereof to the previous model printer which is to operate as the model printer thereafter using the SET command of SNMP. Then, control proceeds to S1115. In the previous model printer which notified the participation of the model printer, whether the settings information is received is determined in S1120 (see FIG. 16C).

In S1115, the printer 23 broadcasts, under control of the CPU 41, that the model printer has changed (i.e., notification that the printer 23 does not function as the model printer, and the previous model printer which notified the participation of the model printer will function as the model printer) using an enhanced TRAP command of SNMP. After S1115, control returns to S1102.

The other printers on the LAN 27 determine whether the broadcast is received, in S1122 of the procedure executed therein.

When the priority of the previous model printer is not higher than the priority of the current model printer 23 (S1112: NO), control proceeds to S1116 (FIG. 16C).

In S1116, the CPU 41 of the current model printer 23 determines whether the request for the priority information is received, through the interface 47, from a printer functioning as the model printer. Such a request is transmitted in S1110 of the procedure executed in the other printer which also functions as the model printer. When the CPU 41 of the current model printer 23 determines that the request is received (S1116: YES), control proceeds to S1117. When the CPU 41 determines that the request has not been received (S1116: NO), control proceeds to S1120. As is understood from the foregoing description, the printer which sent the request for the priority information in S1110 of the procedure executed therein is the previous model printer that notified the participation of the model printer (i.e., the printer which functioned as the model printer on the LAN 27 as the model printer, was disconnected from the LAN 27, and then re-connected to the LAN 27).

In S1117, the CPU 41 of the current model printer 23 transmits the priority information stored in the NVRAM 24 to the printer that requested for the information (i.e., the printer functioning as the model printer) using the REPLY command of SNMP, then control proceeds to S1118. It should be noted that the current model printer 23 receives the priority information transmitted, in S1117, by the previous model printer that notified the participation of the model printer.

In S1118, the CPU 41 of the current model printer 23 determines whether the priority of the previous model printer that notified the participation of the model printer is higher than the priority of the current model printer 23. The priority of the previous model printer is included in the request for the priority transmitted from the previous model printer, which currently operates as the model printer, and received in S1116.

When the CPU 41 of the current model printer 23 determines that the priority thereof is higher than the priority of the previous model printer (S1118: YES), control proceeds to S1120 When the CPU 41 of the current model printer 23 determines that the priority thereof is not higher than the priority of the previous model printer which also operates as the model printer (S1118: NO), control proceeds to S1119. According to this embodiment, if the printer functioning as the model printer is powered off when it operates as the model printer and then is powered on, or if the printer functioning as the model printer is once disconnected from the LAN 27 and then connected again to the LAN 27, the setting of the model flag is maintained to be "Enabled".

In S1119, the CPU 41 of the current model printer 23 changes the model flag stored in the NVRAM 46 from "Enabled" to "Disabled" so that the current model printer 23 does not function as the model printer no longer. Further, if the priority is set to "High", the CPU 41 changes the priority to "Low". Thereafter, control returns to S1103.

With the steps S1118 and S1119, the previous model printer that functions as the model printer changes its setting of the model flag from "Enabled" to "Disabled" since the priority thereof is not higher than the priority of the previous model printer which also functions as the model printer in this case, the current model printer 23 and the previous model printer operate as model printers temporarily, but the model printer function of the current model printer 23 is disabled, and finally, only one printer, i.e., the previous model printer keeps operating as the model printer.

If the priority of the current model printer 23 is higher than the priority of the previous model printer currently functioning as the model printer, the CPU 41 remains the model flag as it is (i.e., "Enabled") so that the printer 23 functions as the model printer thereafter. In this case, the model flag of the previous model printer which also functions as the model printer is changed to "Disabled" in S1113 of the procedure executed therein, and accordingly, it will not operate as the model printer thereafter.

In S1120, the CPU 41 determines whether the CPU 41 receives, through the interface 47, the setting information from the previous model printer that transmitted the request for the priority information. When the CPU 41 of the current model printer 23 determines that the setting information is received from the previous model printer (S1120: YES), control proceeds to S1121. When the CPU 41 determines that the setting information has not been received (S1120: NO), control skips S1121 and proceeds to S1128.

In S1121, the CPU 41 updates the settings stored in the NVRAM 46 in accordance with the setting information received from the previous model printer in S1120. With this update, when the printer which was connected to the LAN 27 and operated as the model printer is re-connected to the LAN 27, and if the priority of the current model printer 23 is higher than that of the previous model printer, the settings stored in the NVRAM 24 of the current model printer 23 is changed in accordance with the setting information of the previous model printer.

In S1128, the CPU 41 of the current model printer 23 determines whether the request for the setting information (i.e., the request executed in S1126 by a printer whose model flag is "Disabled" and the automatic setting flag is "Enabled") is received through the interface 46. When the CPU 41 determines that such a request is received (S1128: YES), control proceeds to S1129. When the CPU 41 determines that such a request is not received (S1128: NO), control returns to S1103.

In S1129, the current model printer 23 transmits, under control of the CPU 41, the settings stored in the NVRAM 46 to the requesting printer (i.e., the printer which transmitted the request for the setting information) using the REPLY command of SNMP. It should be noted that the printer which transmitted the request for the setting information receives the setting information (which is transmitted in S1129) in S1127 (which will be described later) of the procedure executed by the printer that transmitted the request.

Thus, the printer 23 which operates as the model printer and receives the request for the setting information transmits the setting information thereof to the requesting printer (S1128: YES; and S1129).

As aforementioned, when the CPU 41 determines that there is a model printer on the LAN 27 (S1105: YES), control proceeds to S1122 (FIG. 16B).

In S1122, the CPU 41 of the printer 23 determines whether the notification of change of model printer (a notification broadcast in S1107 of the procedure executed by the printer which becomes the model printer, or a notification broadcast in S1115 of the procedure executed by the printer which becomes a non-model printer) through the interface 47. When the CPU 41 determines that the notification of the change of the model printer is received (S1122: YES), control proceeds to S1123. When the CPU 41 determines that such a notification has not been received (S1122: NO), control proceeds to S1125.

In S1123, the CPU 41 of the printer 23 stores, in accordance with the received notification of the change of the model printer, the IP address of the printer which is to operate as the model printer in the NVRMA 46. With this operation, each printer recognizes the printer that operates as the model printer.

In S1125, the CPU 41 determines whether the automatic set flag stored in the NVRAM 46 is "Enabled". When the CPU 41 determines that the automatic set flag is "Enabled" (S1125: YES), control proceeds to S1126. When the CPU 41 determines that the automatic set flag is not "Enabled" (i.e., the automatic set flag is "Disabled") (S1125: NO), control proceeds to S1130.

In S1126, the printer 23 requests the model printer to transmit the setting information using unicast communication with the GET command of SNMP. Thereafter, control proceeds to S1127.

In S1127, the CPU 41 receives, through the interface 47, the setting information of the model printer, and updates the setting information stored in the NVRAM 46 based on the received setting information.

As described above, the printer which does not operate as the model printer and the automatic set flag thereof is "Enabled" (S1125: YES) requests the model printer to transmit its setting information (S1126), receives the setting information from the model printer (S1127) and updates the settings thereof in accordance with the received setting information (i.e., the setting information of the model printer).

In S1130, the CPU 41 operates in a sleep mode, i.e., operates at minimum power consumption. Since the change of the model printer is expected to be executed so frequently, it is not necessary to execute the procedure shown in FIGS. 16A-16C continuously. According to the embodiment, by controlling the CPU 41 to operate in the sleep mode for a certain period, the unnecessary power consumption is avoidable.

Figure 17:
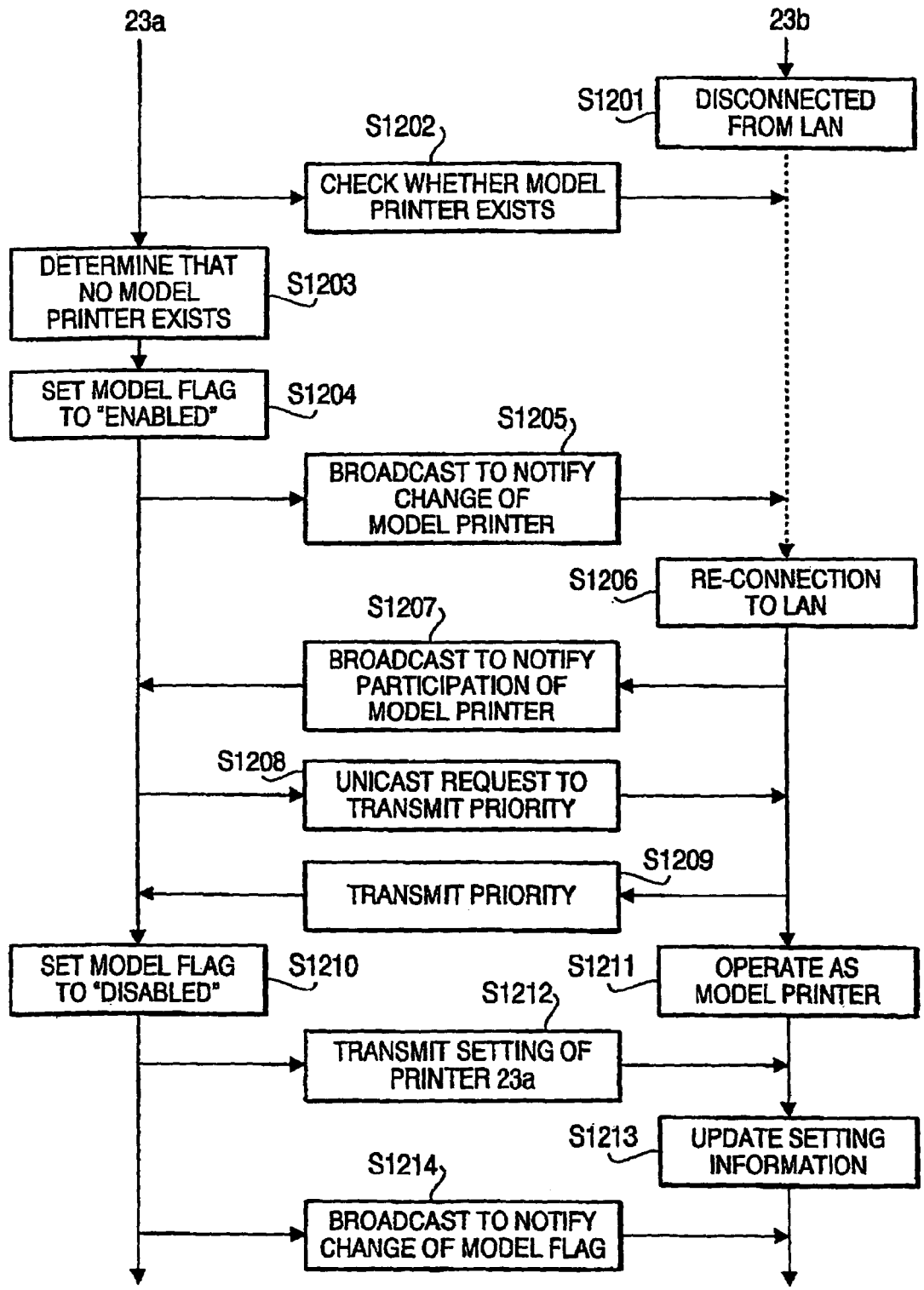
FIG. 17 shows an example of an operational sequence.
Figure 18:
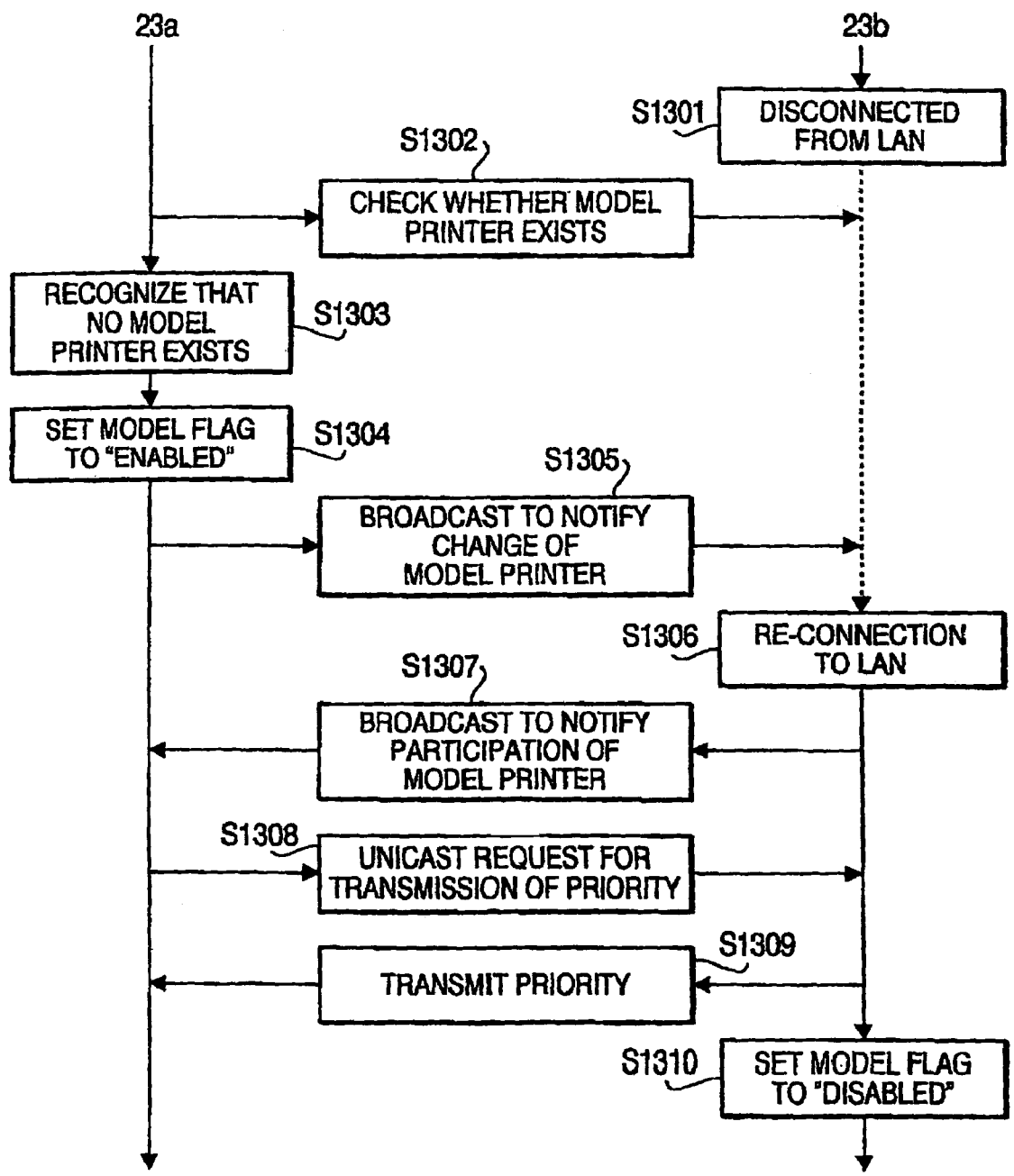
FIG. 18 shows another example of the operational sequence.

Next, operation sequences of the printer 23 according to the fourth embodiment will be described with reference to FIGS. 17 and 18. The sequences shown in FIGS. 17 and 18 are exemplary sequences according to the flowchart shown in FIGS. 16A-16C.

Firstly, the sequence shown in FIG. 17 will be described. In this example, the printer 23 which detects no printers on the LAN 27 and functions to operate as the model printer is referred to as the model printer 23a, and the printer previously operated as the model printer on the LAN 27 is referred to as the previous model printer 23b. Further, the priority of the previous model printer 23b is higher than the priority of the model printer 23a.

Firstly, it is assumed that, the previous model printer 23b functioning as the model printer is disconnected from the LAN 27 when, for example, it is powered off (S1201).

Figure 16A:
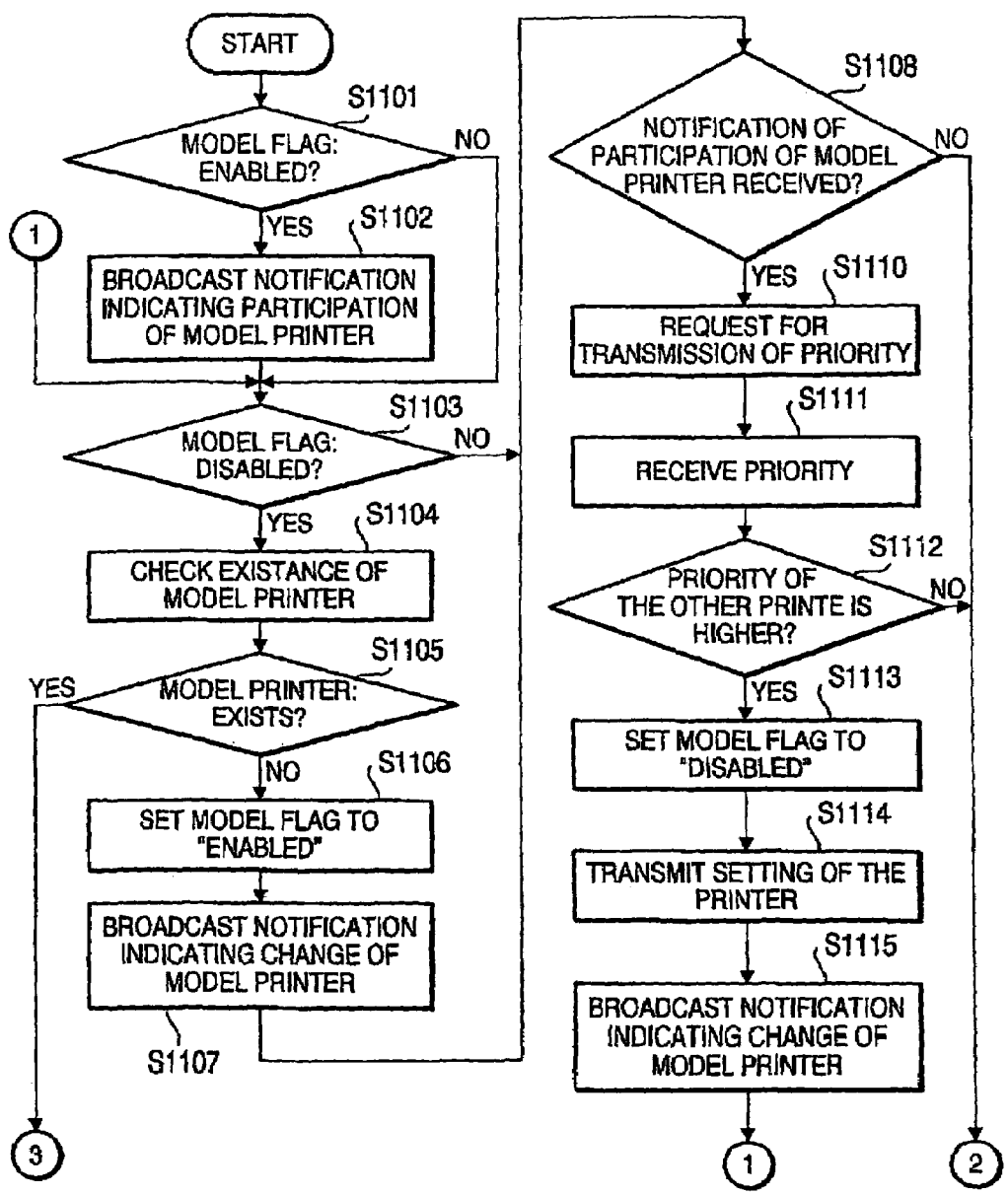
FIGS. 16A-16C shows a flowchart illustrating a setting procedure executed by the printer connected to the network system.
Figure 16B:
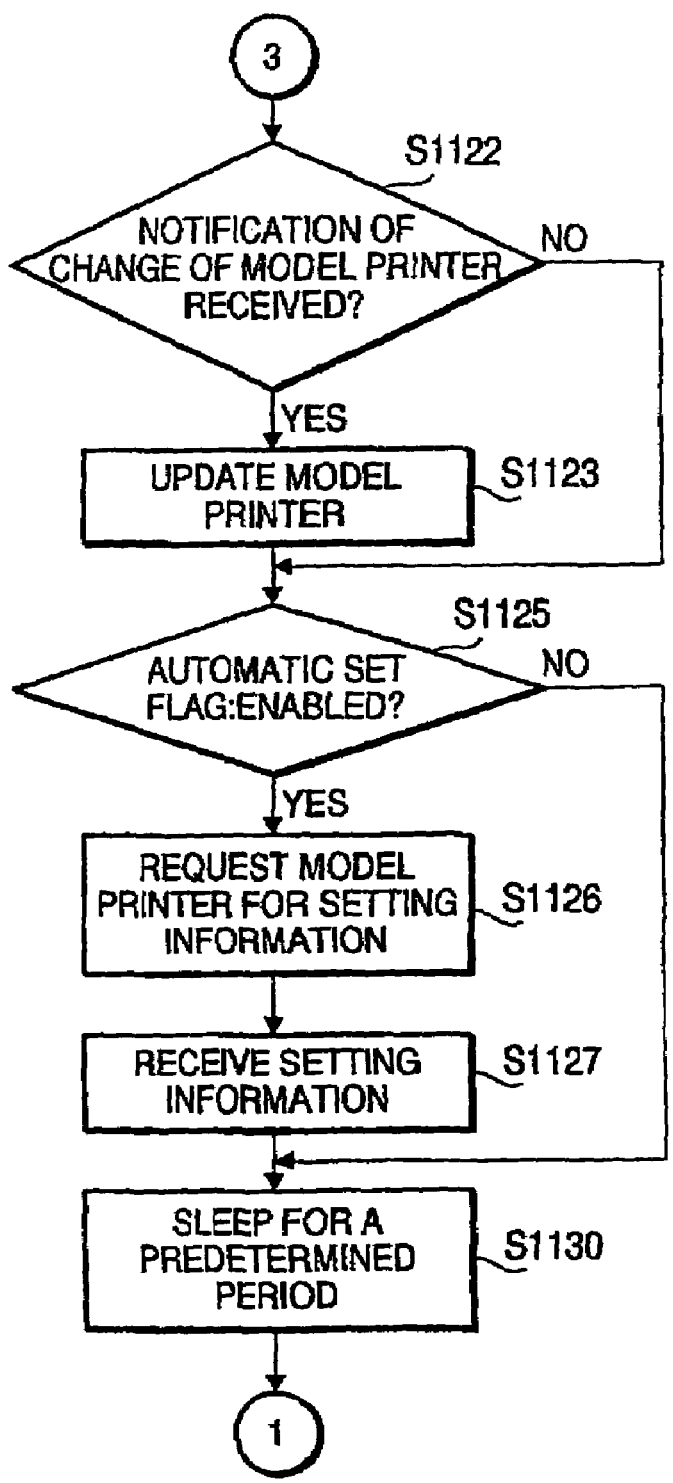
Figure 16C:
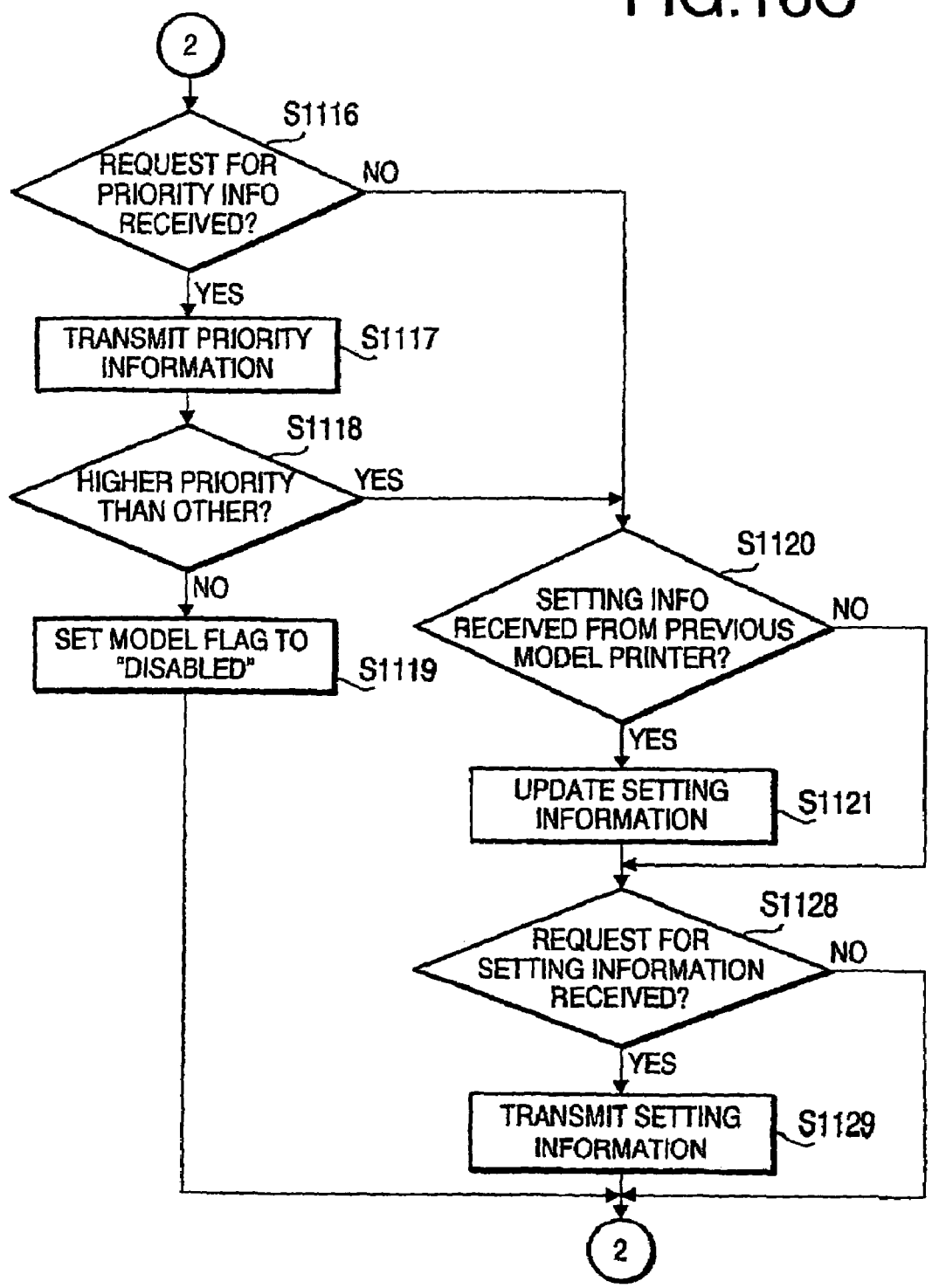

Thereafter, the printer 23a (which is not yet set to the model printer at this stage) searches for the model printer on the LAN 27 in S1202 (which corresponds to S1104 of FIG. 16A executed by the printer 23a). At this stage, since the printer 23b is not on the LAN 27, it cannot communicate with the printer 23a.

The printer 23a recognizes that there are no model printers on the LAN 27 (S1203). This corresponds to S1105 (NO) in FIG. 16A executed by the printer 23a. Since no model printer is on the LAN 27, the CPU 41 of the printer 23a changes the model flag of the printer 23a from "Disabled" to "Enabled" so that the printer 23a operates as the model printer (S1204). This operation corresponds to S1106 of FIG. 16A executed by the printer 23a.

Next, the printer 23a broadcasts, under control of the CPU 41, a notification of the change of the model printer which indicates that the printer 23a functions as the model printer 23a in S1205. This operation corresponds to S1107 of FIG. 16A executed by the printer 23a.

In this example, the previous model printer 23b is re-connected to the LAN 27 at this stage (Sl206). Then, the printer 23b broadcasts a notification informing the participation of the model printer (S1207), which corresponds to S1102 of FIG. 16A executed by the printer 23b.

When the printer 23a receives the notification broadcast by the previous model printer 23b (S1108 in FIG. 16A executed by the printer 23a), it transmits, using a unicast communication, a request for the priority to the printer 23b since the model flag of the printer 23a has been set to "Enabled" in S1204. This operation corresponds to S1110 in FIG. 16A executed by the printer 23a. As aforementioned, the request contains the priority of the printer 23a.

When the printer 23b receives the request for the priority from the printer 23a (S1116: Yes in FIG. 16C executed by the printer 23b), it transmits, under control of the CPU 41, the priority of the printer 23b to the printer 23a (S1209), which corresponds to S1117 in FIG. 16C executed by the printer 23b.

When the printer 23a receives the priority of the printer 23b (S1111 of FIG. 16A executed by the printer 23a), the CPU 41 of the printer 23a determines that the priority of the printer 23b is higher than the priority of the printer 23a, and changes the model flag stored in the NVRAM 46 from "Enabled" to "Disabled" (S3210), which corresponds to S1112 (YES) and S1113 of FIG. 16A executed by the printer 23a. With this change, the printer 23a does not operate as the model printer.

The CPU 41 of the printer 23b determines that the priority of the printer 23b is higher than that of the printer 23a (which corresponds to S1112 (YES) and S1113 of FIG. 16A executed by the printer 23b. Thereafter, the printer 23b operates as the model printer (S1211).

The printer 23a, which becomes the non-model printer in S1210, transmits the setting information thereof stored in the NVRAM 46 to the printer 23b in S1212, which corresponds to, S1114 of the procedure executed by the printer 23a.

When the printer 23b receives the setting information from the printer 23a, the CPU 41 of the printer 23b updates the setting information stored in the NVRAM 46 with the setting information received from the printer 23a in S1213, which corresponds to S1120 (YES) and S1121 of the procedure executed in the printer 23b.

The printer 23a broadcasts, under control of the CPU 41, a notification indicating the change of the model printer in S1214, which corresponds to S1115 of the procedure executed by the printer 23a. It should be noted that the notification includes information indicating that the printer 23a does not operate as the model printer, and information indicating the printer 2 operates as the model printer).

Next, the sequence shown in FIG. 18 will be described. In this example, the printer which detects no printers on the LAN 27 and functions to operate as the model printer is also referred to as the model printer 23a, and the printer previously operated as the model printer on the LAN 27 is also referred to as the previous model printer 23b. Further, the priority of the previous model printer 23b is equal to or lower than the priority of the model printer 23a.

Firstly, it is assumed that, the previous model printer 23b functioning as the model printer is disconnected from the LAN 27 (S1301).

Thereafter, the printer 23a (which is not yet set as the model printer at this stage) searches for the model printer on the LAN 27 in S1302, which corresponds to S1104 of FIG. 16A executed by the printer 23a. At this stage, since the printer 23b is not on the LAN 27, it cannot communicate with the printer 23a.

The printer 23a recognizes that there are no model printers on the LAN 27 in S1303, which corresponds to S1105 (NO) in FIG. 16A executed by the printer 23a. Since no model printer is on the LAN 27, the CPU 41 of the printer 23a changes the model flag of the printer 23a from "Disabled" to "Enabled" so that the printer 23a operates as the model printer in S1304, which corresponds to S1106 of FIG. 16A executed by the printer 23a.

Next, the printer 23a broadcasts, under control of the CPU 41, a notification of the change of the model printer indicating the printer 23a functions as the model printer 23a in S1305, which corresponds to S1107 of FIG. 16A executed by the printer 23a.

In this example, the previous model printer 23b is re-connected to the LAN 27 at this stage (S1306). Then, the printer 23b broadcasts a notification informing the participation of the model printer in S1307, which corresponds to S1102 of FIG. 16A executed by the printer 23b.

When the printer 23a receives the notification broadcast by the previous model printer 23b (S1108 in FIG. 16A executed by the printer 23a), it transmits, using a unicast communication, a request for the priority to the printer 23b since the model flag of the printer 23a has been set to "Enabled" in S1304. This operation corresponds to S1110 in FIG. 16A executed by the printer 23a. As aforementioned, the request contains the priority of the printer 23a.

When the printer 23b receives the request for the priority from the printer 23a (this operation corresponds to S1116 (Yes) in FIG. 16C executed by the printer 23b), it transmits, under control of the CPU 41, the priority of the printer 23b to the printer 23a (S1309), which corresponds to S1117 in FIG. 16C executed by the printer 23b.

When the printer 23a receives the priority of the printer 23b (S1111 of FIG. 16A executed by the printer 23a), the CPU 41 of the printer 23a determines that the priority of the printer 23b is not higher than the priority of the printer 23a. Accordingly, the model flag stored in the NVRAM 46 of the printer 23a is remained as "Enabled" and the printer 23a keeps operating as the model printer. This operation corresponds to S1112 (NO).

The CPU 41 of the printer 23b determines that the priority of the printer 23b is not higher than the priority of the printer 23a, and changes the model flag stored in the NVRAM 46 of the printer 23b from "Enabled" to "Disabled" in S1310, which corresponds to S1118 (NO) and S1119 of FIG. 16A executed by the printer 23b. With this change, the printer 23b does not operate as the model printer.

As described above, when a printer 2 detects that there is no model printer on the LAN 27, it changes its model flag from "Disabled" to "Enabled" so that it operates as the model printer. Therefore, a situation where no model printer exists on the LAN 27 for a long time is avoidable.

Further, since the printer 2, which detects no printers on the LAN 27 and changes its settings so that it operates as a model printer, broadcast the notification indicating that the printer becomes the model printer), the other printers on the LAN 27 can operate appropriately in accordance with the change of the model printer. For example, when the printer which functions as the model printer has been changed, the other printers 23 appropriately operate and transmit the request for the setting information to the newly assigned model printer, but not to the previous model printer.

If a printer which operated as the model printer and was disconnected from the LAN 27 is re-connected to the LAN 27, only one of the previous printer and the current model printer is selected as the model printer based on the priorities assigned to the printers. Therefore, there always is one model printer on the LAN 27, and there will not be a case where a plurality of model printers on the LAN 27.

Further, the newly assigned model printer inherits the settings of the previous model printer. That is, the setting information of the previous model printer is transmitted to the newly assigned model printer. Accordingly, if the settings of the previous model printer had been changed by the user, such settings are inherited to the newly assigned model printer. Thus, the newly assigned model printer can provide the latest setting information to the other printers on the LAN 27.

It should be noted that the invention need not be limited to the configurations according to the embodiments described above. Various modification can be made without departing from the scope of the invention set forth in claims.

For example, according to the fourth embodiment, one of the previous model printer and the current model printer is selected as a new model printer based on the priorities assigned thereto. This system may be modified such that the current model printer is always used and the previous model printer will not be used as the model printer when it is reconnected to the LAN 27. With such a modification, the model printer will not be switched frequently, which may reduce the load to the entire system of the LAN 27. Alternatively, when the system may be configured such that, when the previous model printer is re-connected to the LAN 27, it is used as the new model printer. With such a configuration, the settings of the model printer can be managed with reference to a predetermined printer, the management of the entire system may be eased.

In the fourth embodiment, the priority is includes "High" and "Low". The invention need not be limited to such a configuration. For example, the priority may be represented by date and time when the setting information is changed (updated). In such a case, the priority may be determined such that the later date and time have a higher priority. Alternatively, the number of times when the setting information is changed (updated) may be used for determining the priority. In such a case, for example, the printer having a greater number may have a higher priority.

In the fourth embodiment, when the previous model printer is reconnected to the LAN 27, it broadcasts the participation thereof. The current model printer recognizes that it can receive the setting information from the previous model printer when it receives the notification of participation from the previous model printer reconnected to the LAN 27. The invention need not be limited to such a configuration. The system may be modified such that the current model printer 2 searches for the previous model printer on the LAN 27 periodically (using the GET command of SNMP or ping command), and determines whether the setting of the previous model printer can be received.

The fourth embodiment may be modified such that one model printer may exist for each of types or manufacturers of the printers. Such a configuration can easily be achieved only by incorporating a type of the printer and/or a manufacturer of the printer in the MIB.

In the fourth embodiment, a printer is referred to as an example of an electronic device, and the invention is applicable to a system including or consisting of other electronic devices such as a scanner.

It should be noted that programs to be executed by a computer so that the computer executes the above-described procedures may be provided. Such programs may be stored in a computer-accessible recording medium such as a CD-ROM.

Fifth Embodiment

Figure 19:
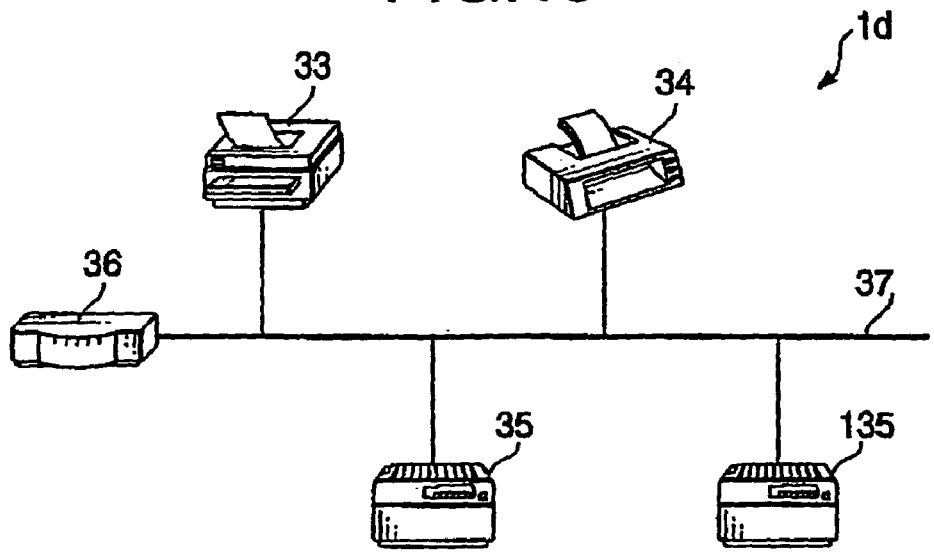
FIG. 19 shows an exemplary configuration of a network system according to a fifth embodiment.

Hereinafter, a fifth embodiment will be described. FIG. 19 shows an exemplary configuration of a network system 1d according to the fourth embodiment. The network system includes, as electronic devices, a router 36, a printer 33, a facsimile device 34, an MFD 35 and another MFD 135, which are interconnected through a LAN 37. According to the fifth embodiment, the printer function of the MFD 135 serves as the model device, and settings of the printer function of the MFD 135 are referred to by each of the printer 33, facsimile device 34 and the MFD 35. According to the fifth embodiment, the electronic devices are capable of receiving I-FAX (Internet Facsimile) transmissions, which is a facsimile transmission architecture using the Internet. According to the I-FAX architecture, an e-mail message attaching a TIFF-F format file is transmitted through the Internet. Each of the printer 33, the facsimile device 34, the MFD 35 and the MFD 135 is capable of receiving the I-FAX transmission, and printing the TIFF-F format file attached to the received e-mail message.

Figure 20:
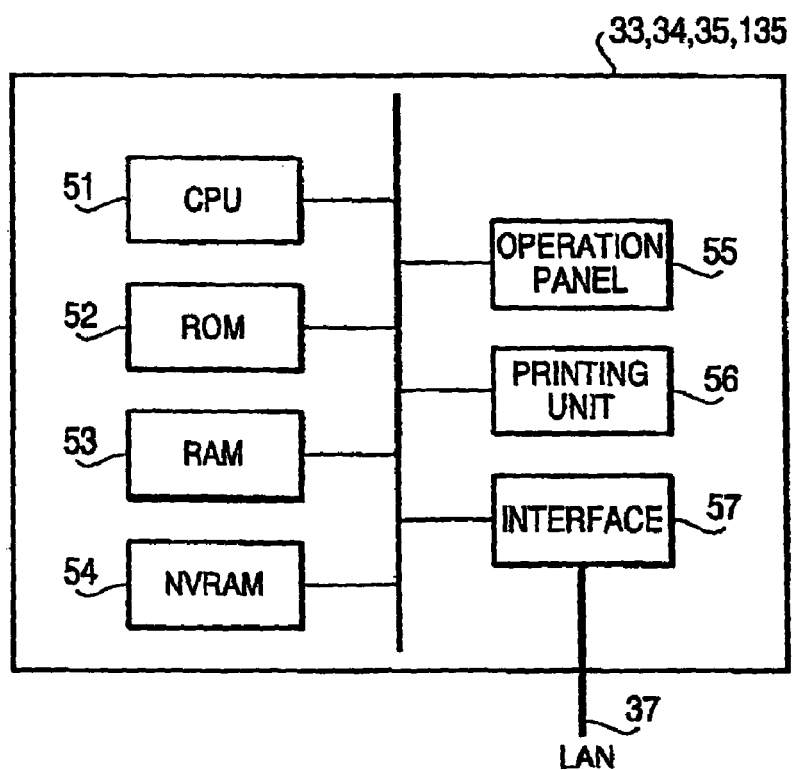
FIG. 20 is a block diagram of a printing-related configuration of each electronic device of the network system shown in FIG. 19.

The configuration of each electronic device (i.e., the printer 33, the facsimile device 34, the printer 35 and the other printer 135 of the network system 1d is substantially the same, which is shown in FIG. 20. It should be noted that, in FIG. 20, only the portion related to print function of each electronic device is indicated.

As shown in FIG. 20, each electronic device (33, 34, 35 and 135) includes a CPU 51, a ROM 52, a RAM 53, an NVRAM 54, an operation panel 55, an printing unit 56 and an interface 57 which interfaces the connection between each electronic device and the LAN 37. Each electronic device receives the I-FAX transmission (i.e., e-mail message attaching an TIFF-F format image file) through the LAN 37 and the interface 57, develops a raster image based on the TIFF-F file, and prints out the image with the printing unit 56. The ROM 52 stores programs to be executed by the CPU 51 to perform the above-described I-FAX receiving procedure, and the RAM 53 temporarily stores data when the CPU 51 executes the procedure.

Various setting parameters are stored in the NVRAM 54. It should be noted that setting parameters are divided into common parameters and uncommon parameters (which are intrinsic to each electronic device). The common parameters of each electronic device are set in accordance with those of the model device (i.e., the MFD 135).

FIGS. 23A and 23B show examples of the common parameters and uncommon (intrinsic) parameters, respectively.

As shown in FIG. 23A, the common parameters include a parameter "POP Server Address" representing an IP address of a mail server from which each electronic device obtains the I-FAX transmissions (i.e., e-mail messages attaching TIFF-F format files) a parameter "POP Polling Interval" representing an interval at which the electronic server accesses the mail server to obtain the I-FAX transmissions. A parameter "Toner Save" indicates whether the image is to be printed in a toner save mode. When the "Toner Save" parameter is set to "Yes", the image is printed in the toner save mode, i.e., at a low thickness density, while when the "Toner Save" is set to "No", the image is printed at a high thickness density.

As shown in FIG. 23B, the uncommon (intrinsic) parameters include a parameter "Own Mail Address" representing an e-mail address of each electronic device. In order to receive the I-FAX transmission, the e-mail address is necessary since the I-FAX transmission is an e-mail message with the attached TIFF-F format image file. Since each electronic device is connected to the network system 1d, each has its own IP address, which is another example of an uncommon parameter (indicated as "Own IP Address" in FIG. 23B).

Hereinafter, the operation of each electronic device for printing the I-FAX transmission will be described. It should be noted that the common setting parameters of the model device (i.e., the MFD 135) are transmitted to the other electronic device. The modification of the setting parameters in each electronic device may be performed as in the network system according to the first, second, third or fourth embodiment, and will not be described herein.

Figure 21:
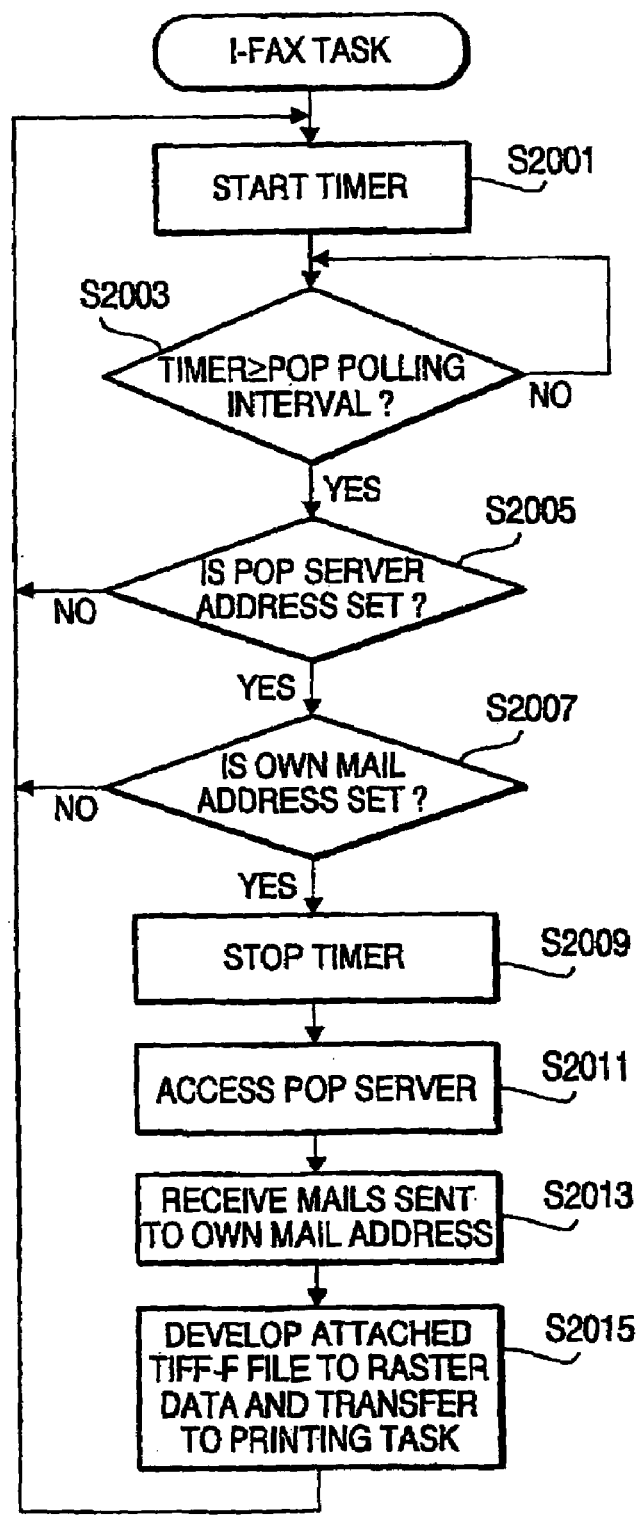
FIG. 21 shows a flow chart illustrating an I-FAX task performed by each electronic device of the network system shown in FIG. 19.

Next, an I-FAX task, which is a procedure executed in each electronic device (including the model electronic device) to receive I-FAX transmissions will be described with reference to FIG. 21. The I-FAX task shown in FIG. 21 is executed when the electronic device is reset or powered ON. It should be noted that the I-FAX task is only for receiving the I-FAX transmissions, and this procedure runs independently from the other procedures such as one for transmitting the setting parameters between the model device and the other electronic devices.

In S2001, the CPU 51 of the electronic device (e.g., 33) starts a timer implemented therein. As described above, the electronic device attempts to obtain the I-FAX transmission at every predetermined period which is defined by the parameter "POP Polling Interval". The timer is started to measure this period. In S2003, the CPU 51 determines whether the predetermined period (i.e., the value of "POP Polling Interval" which is 10 minutes in the example shown in FIG. 23A). Until the timer measures the period defined by the parameter "POP Polling Interval" (i.e., S2003: NO), step S2003 is repeated. When the timer measures the predetermined period (S2003: YES), control proceeds to S2005.

In S2005, the CPU 51 determines whether the parameter "POP Server Address" is set. When the "POP Server Address" has not been set (S2005: NO), the electronic device cannot identify a mail server address and thus the I-FAX transmission cannot be received. In such a case, control returns to S2001, and the timer is reset (S2001) to measure another interval defined by the "POP Polling Interval". When the CPU 51 determines that the "POP Server Address" is set (S2005: YES), the CPU 51 determines whether the electronic device has its own e-mail address (S2007). If the electronic device does not have its own e-mail address, even through it accesses the mail server, it receives none of the e-mails. Therefore, when the e-mail address is not set (S2007: NO), control returns to S2001. When the e-mail address is set (S2007: YES), the CPU 51 stops the timer (S2009), and accesses the POP server (S2011) and receives e-mail messages addressed to the e-mail address of the electronic device (S2013). As aforementioned, the I-FAX transmission is an e-mail message to which a TIFF-F format image file is attached. In S2015, the CPU 51 develop raster data based on the TIFF-F format image file of the I-FAX transmission, and then transmits the thus developed image data to a printing task, which will be described below. After transmitting the image data to the printing task, control returns to S2001, where the timer is re-started and the above-described procedure is repeated. Optionally, the I-FAX transmission (i.e., the e-mail message with the TIFF-F file) may be deleted from the mail server when it is transmitted to the addressed electronic device.

Figure 22:
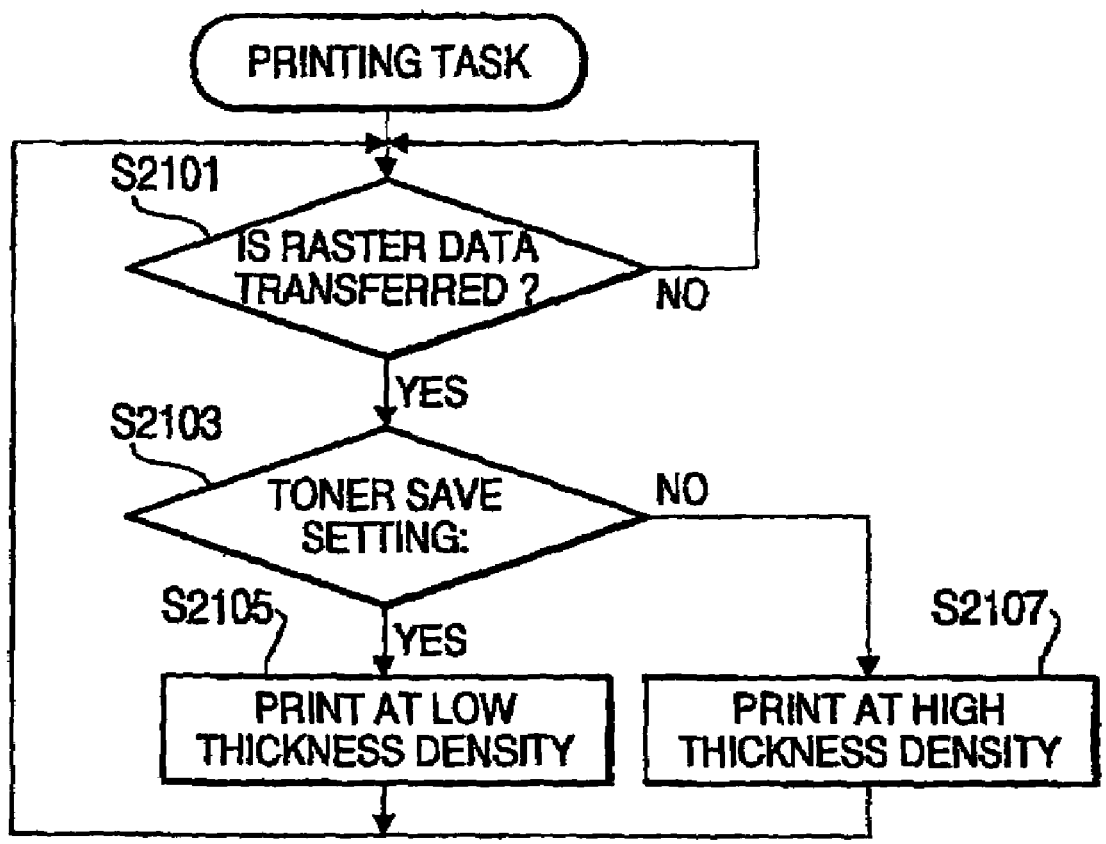
FIG. 22 shows a flowchart illustrating a print task performed by each electronic device shown in FIG. 19.

FIG. 22 shows a flowchart illustrating the printing task executed by each electronic device for printing the I-FAX transmission.

In S2101, until the raster data is transmitted from the I-FAX task (S2101: NO), step S2101 is repeated. When the raster data is transmitted from the I-FAX task (S2101: YES), the CPU 51 determines whether the toner save setting is "Yes" (i.e., to be printed at a low thickness density). When the parameter "Toner Save" is set to "Yes" (S2103: YES), the CPU 51 controls the printing unit 56 to print the transmitted image (raster data) at the low thickness density (S2105). When the parameter "Toner Save" is not set to "Yes" (i.e., set to "No" or it is not set), the CPU 51 controls the printing unit 56 to print the image at the high thickness density. After printing the image (S2105 or S2107), control returns to S2101 to wait for a further transmission of the raster data.

As described, the common setting parameters of each electronic device are set in accordance with the parameters of the model device, and operates in accordance with the thus set parameters. In other words, each electronic device set the parameters based on the parameters of the model device, and operates in accordance with the thus set parameters.

The present disclosure relates to the subject matter contained in Japanese Patent Applications No. 2002-5964, filed on Jul. 25, 2002, and No. 2002-333269, file on Nov. 11, 2002, which are expressly incorporated herein by reference in their entireties.

What is claimed is:

1. A configuration setting system for a network system including a plurality of electronic devices communicably connected to a network, said configuration setting system setting a configuration of an electronic device based on a configuration of another electronic device that functions as a model device, said plurality of electronic devices including a candidate electronic device to operate as the model device, said candidate electronic device being provided with:

a checking system that checks whether there is a currently operating model device on said network when said candidate electronic device is to function as the model device;

a determining system that determines, when said checking system detects the model device, only one of said candidate electronic device and the currently operating model device as a new model device; and a configuration sending system that sends configuration information of the candidate electronic device to said plurality of electronic devices when the candidate electronic device is determined as the new model device by the determining system;

wherein said currently operating model device is configured such that whether a a function of the model device is to be maintained is set, and wherein said determining system determines that the currently operating model device as the model device when said currently operating model device is configured such that the function of the model device is to be maintained.

2. The configuration setting system according to claim 1, wherein said determining system including an input device that allows a user to select one of said candidate electronic device and the currently operating model device as the new model device.

3. The configuration setting system according to claim 1, wherein said candidate electronic device is provided with a notification system that notifies other electronic devices that said candidate electronic device operates as the model device when said determining system determines said candidate electronic device as the new model device.

4. An electronic device capable of operating as a model device for a configuration setting system for a network system having a plurality of electronic devices communicably connected to a network, a configuration of the plurality of electronic devices being set based on a configuration of the model device, said electronic device capable of operating as the model device being provided with:

a checking system that checks whether there is a currently operating model device on the network when said electronic device is to function as the model device;

a determining system that determines, when said checking system detects the currently operating model device on the network, one of said electronic device and the currently operating model device as a new model device; and a configuration sending system that sends configuration information of the electronic device to said plurality of electronic devices when the electronic device is determined as the new model device by the determining system;

wherein said currently operating model device is configured such that whether a function of the model device is to be maintained is set, and wherein said determining system determines that the currently operating model device as the model device when said currently operating model device is configured such that the function of the model device is to be maintained.

5. A computer accessible storage which stores a program which is executed by a computer so that the computer function as an electronic device capable of operating as a model device for a configuration setting system for a network system having a plurality of electronic devices communicably connected to a network, a configuration of the plurality of electronic devices being set based on a configuration of the model device, said electronic device capable of operating as the model device being provided with:

a checking system that checks whether there is a currently operating model device on the network when said electronic device is to function as the model device;

a determining system that determines, when said checking system detects the currently operating model device on the network, one of said electronic device and the currently operating model device as a new model device; and a configuration sending system that sends configuration information of the electronic device to said plurality of electronic devices when the electronic device is determined as the new model device by the determining system;

wherein said currently operating model device is configured such that whether a function of the model device is to be maintained is set, and wherein said determining system determines that the currently operating model device as the model device when said currently operating model device is configured such that the function of the model device is to be maintained.

6. A configuration setting system for a network system including a plurality of electronic devices communicably connected to a network, said configuration setting system setting a configuration of an electronic device based on a configuration of a predetermined electronic device functioning as a model device, said predetermined electronic device being provided with:

a checking system that checks whether there is a currently operating model device on said network when said predetermined electronic device is to function as the model device;

a determining system that determines, when said checking system detects no model device, said predetermined electronic device as the model device for said network system; and a configuration sending system that sends configuration information of the predetermined electronic device to said plurality of electronic devices when the predetermined electronic device is determined as a new model device by the determining system;

wherein, when said currently operating model device is on said network, said operating model device is configured such that whether a function of the model device is to be maintained is set, and wherein said determining system determines that the currently operating model device is kept operating as said model device when said currently operating model device is configured such that the function of the model device is to be maintained.

7. The configuration setting system according to claim 6, wherein, said determining system includes an input system that allows a user to select one of the currently operating model device and said predetermined electronic device as said model device, wherein when said currently operating model device is on said network and the function as said model device is releasable, said determining system determining selected one of said currently operating model device and said predetermined electronic device as said model device and the other as a non-model device.

8. The configuration setting system according to claim 7, further including a setting system that sets the configuration of said currently operating model device to function as the non-model device, and sets the configuration of said predetermined electronic device to function as said model device when said predetermined electronic device is determined to be said model device.

9. The configuration setting system according to claim 7, further including a setting system that sets the configuration of said predetermined electronic device to function as said non-model device when said currently operating electronic device is determined to be said model device.

10. The configuration setting system according to claim 9, wherein said setting system obtains the configuration of said currently operating model device and updates the configuration of said predetermined electronic device in accordance with the configuration of said currently operating model device.

11. The configuration setting system according to claim 6, further including a setting system, wherein said determining system includes an input system that allows a user to select one of the currently operating model device and said predetermined electronic device as said model device, and wherein, when said currently operating model device is on said network and the function as said model device is not releasable, said setting system sets the configuration of said predetermined electronic device so as to operate as the non-model device.

12. The configuration setting system according to claim 11, wherein said setting system obtains the configuration of said currently operating model device and updates the configuration of said predetermined electronic device in accordance with the configuration of said currently operating model device.

13. The configuration setting system according to claim 1, wherein the configuration includes operational parameters for each electronic device, each electronic device operates in accordance with the operational parameters.

* * * * *